US 8,656,340 B2

United States Patent
Ishida

(10) Patent No.: US 8,656,340 B2
(45) Date of Patent: Feb. 18, 2014

(54) DELAY ANALYSIS APPARATUS, COMPUTER-READABLE RECORDING MEDIUM HAVING DELAY ANALYSIS PROGRAM STORED THEREON, AND DELAY ANALYSIS METHOD

(75) Inventor: Tsutomu Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 13/046,889

(22) Filed: Mar. 14, 2011

(65) Prior Publication Data

US 2011/0301896 A1 Dec. 8, 2011

(30) Foreign Application Priority Data

Jun. 2, 2010 (JP) ................................. 2010-126491

(51) Int. Cl.
*G06F 17/50* (2006.01)

(52) U.S. Cl.
USPC ............ 716/136; 716/108; 716/113; 716/134

(58) Field of Classification Search
USPC ................. 716/108, 113, 134, 136; 702/79
See application file for complete search history.

(56) References Cited

U.S. PATENT DOCUMENTS

| 6,253,359 B1 * | 6/2001 | Cano et al. ..................... 716/113 |
| 6,353,917 B1 * | 3/2002 | Muddu et al. ................. 716/113 |
| 7,784,003 B2 * | 8/2010 | Buck et al. ..................... 716/113 |
| 7,934,182 B2 * | 4/2011 | Nitta et al. ..................... 716/100 |

FOREIGN PATENT DOCUMENTS

| JP | 2-90267 | 3/1990 |
| JP | 2000-305966 | 11/2000 |

OTHER PUBLICATIONS

Bastani, et al., "Statistical Diagnosis of Unmodeled Systematic Timing Effects", DAC'08, 22.1, pp. 355-360, Jun. 8-13, 2008.
Bastani, et al., "Speedpath Prediction Based on Learning from a Small Set of Examples", DAC'08, 12.3, pp. 217-222, Jun. 8-13, 2008.
Fukuoka, et al., "Statistical Gate Delay Model for Multiple Input Switching", ASP DAC'08, 4A-1, pp. 286-291, 2008.
Killpack, et al., "Silicon Speedpath Measurement and Feedback into EDA Flows", DAC'2007, 22.2, pp. 390-395, Jun. 4-8, 2007.

* cited by examiner

*Primary Examiner* — Sun Lin
(74) *Attorney, Agent, or Firm* — Staas & Halsey LLP

(57) ABSTRACT

If there are a plurality of activation paths on which a signal propagates during a delay test, multiple-input cells receiving two or more activation paths are extracted by an extraction unit. For the extracted multiple-input cells, whether there is a possibility of occurrence of a multiple-input switching in a multiple-input cell is determined by a determination unit, based on an input timing to each signal multiple-input cell in the two or more activation paths. Then, an occurrence situation of a multiple-input switching is analyzed as one delay cause by an analysis unit, based on a determination result by the determination unit and a result of the delay test.

20 Claims, 18 Drawing Sheets

FIG. 12A $$F(Pi) = \begin{Bmatrix} f1\_Pi \\ f2\_Pi \\ f3\_Pi \\ f4\_Pi \\ f5\_Pi \\ \vdots \\ fg1\_Pi \\ fg2\_Pi \\ \vdots \\ fgx\_Pi \end{Bmatrix}$$

f1_Pi : number of low-power transistors on path Pi
f2_Pi : "1" when path Pi crossing specified region 1/"0" when not crossing
f3_Pi : "1" when path Pi crossing specified region 2/"0" when not crossing
f4_Pi : alue related to temperature condition of pass region of path Pi
(ex. higher value at higher temperature)
f5_Pi : value indicating magnitude of influence of cross-talk noise of path Pi
:

$\begin{rcases} fg1\_Pi \\ fg2\_Pi \\ \vdots \\ fgx\_Pi \end{rcases}$ fgj_Pi :
(1) "1" when multiple-input cell gj (j = 1-x) exists on path Pi,
and there is possibility of occurrence of multiple-input switching
(or any other positive value according to its possibility)
(2) "0" when multiple-input cell gj exits on Pi,
but there is no possibility of occurrence of multiple-input switching,
or when multiple-input cell gj does not exist on Pi

FIG. 12B $$F(Pi) = \begin{Bmatrix} f1\_Pi \\ f2\_Pi \\ f3\_Pi \\ f4\_Pi \\ f5\_Pi \\ \vdots \\ fnand\_Pi \\ fnor\_Pi \end{Bmatrix}$$

fnand_Pi : (1) "1" when NAND gate exists on the path Pi,
and there is possibility of occurrence of multiple-input switching
"1" (or its number of NAND gates)
(2) "0" when NAND gate exists on Pi but there is no possibility
of occurrence of multiple-input switching,
or when NAND gate does not exist on Pi
fnor_Pi : (1) "1" when NOR gate exists on the path Pi,
and there is possibility of occurrence of multiple-input switching
"1" (or its number of NOR gates)
(2) "0" when NOR gate exists on Pi but there is no possibility
of occurrence of multiple-input switching,
or when NOR gate does not exist on Pi

FIG. 13A $$F(Pi) = \begin{pmatrix} f1\_Pi \\ f2\_Pi \\ f3\_Pi \\ f4\_Pi \\ f5\_Pi \\ \vdots \\ fg1\_Pi \\ fg2\_Pi \\ \vdots \\ fgx\_Pi \end{pmatrix} = \begin{pmatrix} 5 \\ 0 \\ 1 \\ 3 \\ 0 \\ \vdots \\ 1 \\ 0 \\ \vdots \\ 0 \end{pmatrix} \quad F(Pj) = \begin{pmatrix} f1\_Pj \\ f2\_Pj \\ f3\_Pj \\ f4\_Pj \\ f5\_Pj \\ \vdots \\ fg1\_Pj \\ fg2\_Pj \\ \vdots \\ fgx\_Pj \end{pmatrix} = \begin{pmatrix} 1 \\ 1 \\ 0 \\ 8 \\ 0 \\ \vdots \\ 0 \\ 1 \\ \vdots \\ 0 \end{pmatrix}$$

FIG. 13B $$F(Pi) = \begin{pmatrix} f1\_Pi \\ f2\_Pi \\ f3\_Pi \\ f4\_Pi \\ f5\_Pi \\ \vdots \\ fnand\_Pi \\ fnor\_Pi \end{pmatrix} = \begin{pmatrix} 5 \\ 0 \\ 1 \\ 3 \\ 0 \\ \vdots \\ 2 \\ 0 \end{pmatrix} \quad F(Pj) = \begin{pmatrix} f1\_Pj \\ f2\_Pj \\ f3\_Pj \\ f4\_Pj \\ f5\_Pj \\ \vdots \\ fnand\_Pj \\ fnor\_Pj \end{pmatrix} = \begin{pmatrix} 1 \\ 1 \\ 0 \\ 8 \\ 0 \\ \vdots \\ 1 \\ 0 \end{pmatrix}$$

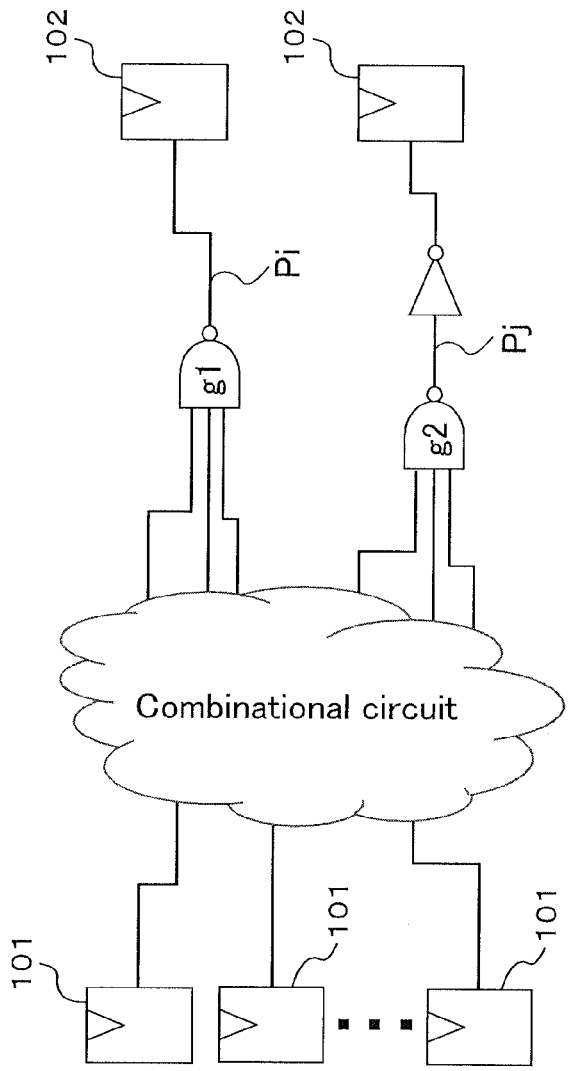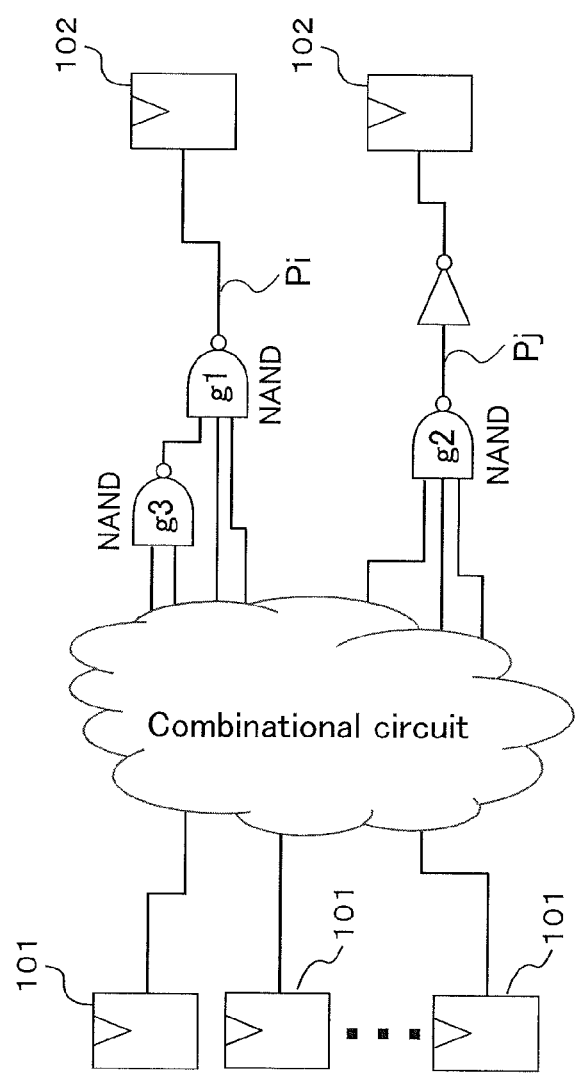
FIG. 14A
FIG. 14B

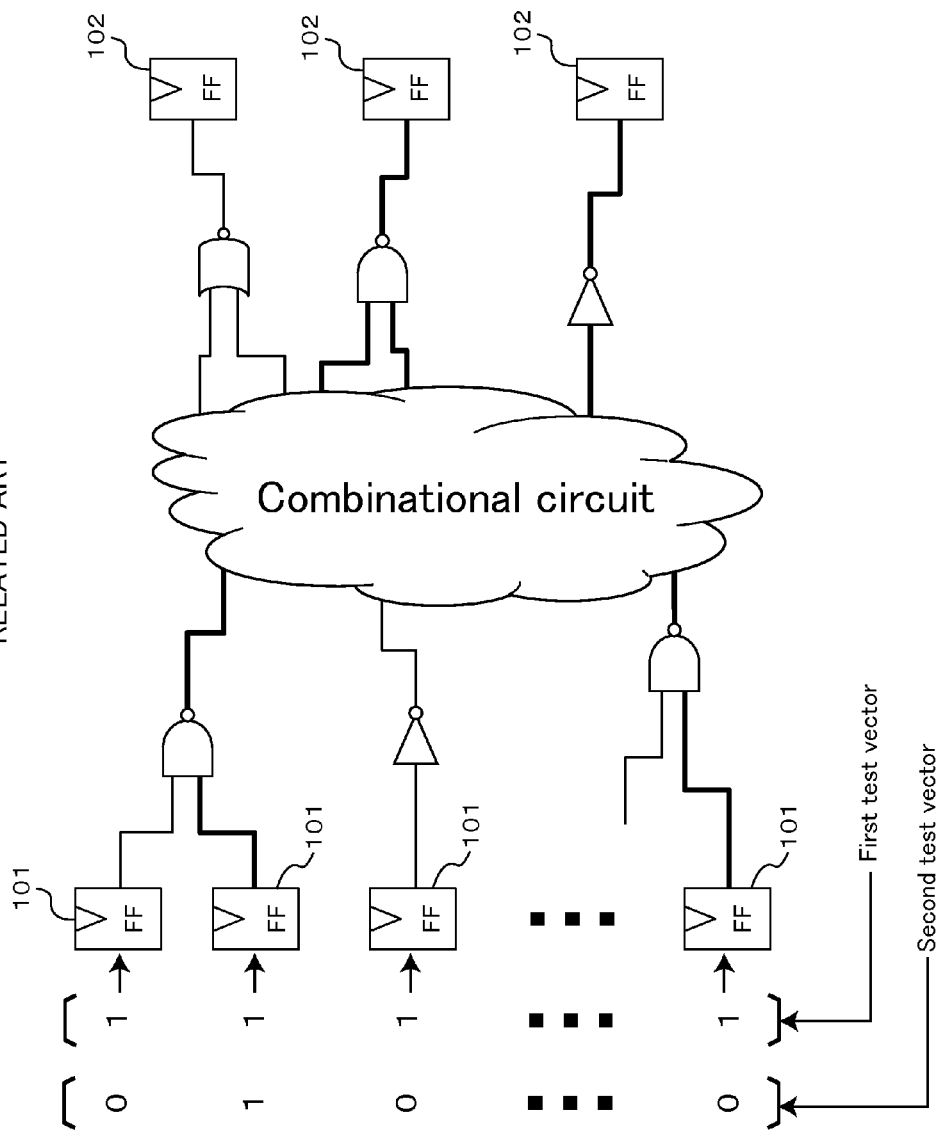

US 8,656,340 B2

DELAY ANALYSIS APPARATUS, COMPUTER-READABLE RECORDING MEDIUM HAVING DELAY ANALYSIS PROGRAM STORED THEREON, AND DELAY ANALYSIS METHOD

CROSS-REFERENCE TO RELATED APPLICATIONS

This application is based upon and claims the benefit of priority of the prior Japanese Patent Application No. 2010-126491, filed on Jun. 2, 2010, the entire contents of which are incorporated herein by reference.

FIELD

The present disclosure relates to a delay analysis apparatus, a computer-readable recording medium having a delay analysis program stored thereon, and a delay analysis method.

BACKGROUND

In recent years, in design and manufacturing of chips, an increasing number of chips, e.g., integrated circuits, such as LSIs (Large Scale Integrations), actually manufactured, fail to satisfy the performance reference values, i.e., specs, defined in the design phase, due to the scale-down of processes. More specifically, an increasing number of chips have path delay values (real values) actually obtained in the real chips, that is deviated from prediction values of path delays of the chips designed calculated using a simulation tool or like during the design phase. As a result, such actual chips often fail to satisfy the spec defined during the design phase.

This necessitates delay tests on actual chips during design and manufacturing of chips. FIG. 16 is a flowchart schematically illustrating a typical design and manufacturing procedure of chip, including a delay test. As depicted in FIG. 16, after a chip is designed (Step S1), a prototype chip of the designed chip, i.e., an actual chip, is fabricated (Step S2). A delay test is performed on the actual chip (Step S3) to determine whether the result of the delay test satisfies a predetermined spec.

The result of the delay test satisfies a predetermined spec (the YES route in Step S3), actual chips are started to be manufactured based on the design made in Step S1 (Step S4). Otherwise, the result of the delay test satisfies a predetermined spec (the NO route in Step S3), a failure analysis, i.e., a delay cause analysis is performed based on the result of the delay test (Step S5). The flow returns to Step S1, wherein a chip is redesigned in accordance with the analysis result in Step S5.

A delay test is a test for identifying the clock frequency or clock cycle at which the tested actual chip can operate, and the following operations are carried out in a single delay test. Note that FIG. 17 is a drawing illustrating an example of circuit configuration on a test target actual chip for illustrating a typical delay test. In FIG. 17, reference symbol 101 indicates a flip flop (FF), which is an input-side resistor on an actual chip, while reference symbol 102 indicates another flip flop (FF), which is an output-side resistor on the chip, and a combinational circuit including various types of gates is arranged between the FF 101 and the FF 102. The connections within the combinational circuit are specified based on a net list of a circuit to be designed.

Firstly, two test vectors are provided, and a signal based on inputs of the two test vectors are propagated from the input-side FF 101 to the output-side FF 102 of the actual chip. After the first test vector is input, the second test vector is input to the input-side FF 101 of the actual chip by issuing two clocks having a certain time interval, which is captured in the output-side FF 102. The value in the output-side FF 102 is compared against an expected value (prediction value) expected to be obtained at the output-side FF 102 after the two test vectors are input to determine whether these values are matched.

If they match, after the predetermined time interval is incrementally reduced, such as with a decrement of 20 MHz, for example, two test vectors are input again to determine whether the value at the output-side FF 102 matches the expected value. The procedure is repeatedly executed until the value at the output-side FF 102 and the expected value mismatch. The time interval (cycle) immediately before the mismatch occurs is obtained as a result of the delay test, i.e., the measurement value of the delay time in the test.

It is determined that whether the obtained measurement value satisfies a predetermined spec. If it is determined that the predetermined spec is satisfied, i.e., the prototyped actual chip operates normally at the targeted clock cycle, actual chips are started to be manufactured (Step S4), as described above. Otherwise, if it is not determined that the predetermined spec is satisfied, a delay cause analysis is performed based on the result of the delay test (Step S5) and redesign is made (Step S1).

In Step S5, references to the measurement value of the delay time obtained in the delay test, and the path on which a signal propagates through the input of the two test vectors in the delay test, i.e., activated path are made. Then, an analysis on the delay cause is made, based on the measurement value and the activated path. Hereinafter, such an "activated path" is referred to as an "activation path". The activation path is calculated and identified based on a net list of the circuit to be designed and values of two test vectors input in the delay test. In FIG. 17, activation paths are drawn in thick lines.

In addition, a technique called "speed path analysis" is used as a failure analysis technique in Step S5, for example. In such a speed path analysis, if the number of activation paths during the delay test is one, the measurement value of the delay time obtained in the delay test is assigned to that activation path for analysis. Alternatively, if the number of activation paths during the delay test is two or more, in other words, two or more activation paths are connected to a single output-side FF via a multiple-input cell, one of the two or more activation paths is selected (they are narrowed down to one). This narrowing down is performed by selecting one activation path having the maximum delay time from the input-side FF to the multiple-input cell delay time, among the two or more activation paths, for example. After the measurement value of the delay time obtained in the delay test is assigned to the one narrowed-down activation path for performing the analysis.

The above-described deviation between a prediction value of a path delay and a path delay value obtained at an actual chip (actual value) is caused by a phenomenon that has been modeled only in a simplified manner, but has become noticeable due to the scale-down of processes. As one cause of such "deviation", a phenomenon called multiple-input switching (MIS) in a multiple-input cell has attracted great deal of attentions.

A multiple-input switching is a phenomenon in which, when multiple signals are simultaneously or substantially simultaneously input to a multiple-input cell, such as a NAND or NOR, for example, the delay time of the output from the multiple-input cell in response to the input is shortened or lengthened than an assumed value. Such a multiple-input switching will be described with reference to FIG. 18A to FIG. 18D, using an example of a 2-input NAND gate.

At the NAND gate depicted in FIG. 18A, two input signals which transition from 0 to 1 are input at the timing $A_A$ and $A_B$, and an output signal which transitions from 1 to 0 is output at the timing $A_{OUT}$. FIG. 18B is a graph indicating the relationship of the input time difference $S_{AB}$ (=$A_A$-$A_B$) between the two input signals and the delay time "delay" at the output from the NAND gate, when the signal transition depicted in FIG. 18A occurs. As depicted in FIG. 18B, it has been well-known that the output delay time "delay" is increased by 16% at maximum than the assumed value $D_A$ or $D_B$ when the two input signals are substantially simultaneously input to the NAND gate and the output signal falls from 1 to 0.

At the NAND gate depicted in FIG. 18C, two input signals which transition from 1 to 0 are input at the timing $A_A$ and $A_B$, and an output signal which transitions from 0 to 1 is output at the timing $A_{OUT}$. FIG. 18D is a graph indicating the relationship of the input time difference $S_{AB}$ the delay time "delay" at the output from the NAND gate, when the signal transition depicted in FIG. 18C occurs. As depicted in FIG. 18D, it has been well-known that the output delay time "delay" is reduced by 34% at maximum than the assumed value $D_A$ or $D_B$ when the two input signals are substantially simultaneously input to the NAND gate and the output signal rises from 0 to 1.

Here, the assumed value $D_A$ is the value of the output delay time "delay" at the region in which the input timing $A_A$ in a first path (on the side of A) is sufficiently slower than the input timing $A_B$ in a second path (on the side of B), i.e., the region in which the delay in the first input path is dominant (A dominant). In contrast, the assumed value $D_B$ is the value of the output delay time "delay" at the region in which the input timing $A_B$ in the second path is sufficiently slower than the input timing $A_A$ in the first, i.e., the region in which the delay in the second input path is dominant (B dominant). The input timing $A_A$ or $A_B$ of each path corresponds to the delay time from input-side FF to the NAND gate on that path.

When a multiple-input switching as described above are considered, the following two scenarios (1) and (2) are possible when two or more paths inputting to one multiple-input cell are activated. As used herein, a delay time from the input-side FF to the multiple-input cell in an activation path is referred to as a "path delay value".

(1) A scenario in which one activation path is dominant. More specifically, one path delay value of two or more activation paths is significantly greater than path delay values of other activation paths, and the one activation path determines a measurement value obtained in a delay test.

(2) A scenario in which a multiple-input switching is occurring. More specifically, signals of two or more activation paths are input at the same or substantially same timing. In other words, the path delay values of the two or more activation paths are the same or substantially same, and all of the two or more activation paths determine a measurement value obtained in a delay test.

In conventional failure analysis techniques, the two or more activation paths are narrowed down to one path in both of the above scenarios (1) and (2), and the measurement value is assigned to that one narrowed-down activation path for performing a failure analysis. In the above scenario (1), the narrowing-down causes is not problematic since that one activation path is dominant. In contrast, in the above scenario (2), that is, a multiple-input switching is occurring, although all of the two or more activation paths possibly affect the measurement value, a failure analysis is performed on a single activation path that has the greatest path delay value. As a result, information on the multiple-input switching is discarded, and any determination as of occurrence of a multiple-input switching or any consideration on the effect of a multiple-input switching during an analysis cannot be made, which may make the failure analysis inaccurate.

In addition to the failure analysis technique described above, another technique is well-known in which a cell causing a multiple-input switching is identified based in measurement value obtained in a delay test. This technique, the sensitivity of each cell in a combinational circuit is determined by using fitting computation to a linear method using the Monte Carlo technique, and a cell causing a multiple-input switching can be identified based on the determined sensitivity. However, the computation processing of this technique takes great deal of time.

Patent Reference 1: Japanese Laid-Open Patent Application No. H02-90267
Patent Reference 2: Japanese Laid-open Patent Publication No. 2000-305966
Non-Patent Reference 1: P. Bastani, N. Callegari, Li-C. Wang, et al., "Statistical Diagnosis of Unmodeled Systematic Timing Effects", DAC'08, 22.1, pp. 355-360
Non-Patent Reference 2: P. Bastani, K. Killpack, et al., "Speedpath Prediction Based on Learning from a Small Set of Examples", DAC'08, 12.3, pp. 217-222
Non-Patent Reference 3: T. Fukuoka, A. Tsuchiya, et al., "Statistical Gate Delay Model for Multiple Input Switching", ASP DAC'08, 4A-1, pp. 286-291
Non-Patent Reference 4: K. Killpack, C. Kashyap, et al., "Silicon Speedpath Measurement and Feedback into EDA flows", DAC2007, 22.2, pp. 390-395

SUMMARY

A delay analysis apparatus of the present disclosure is a delay analysis apparatus that analyzes a delay cause based on a result of a delay test on an actual chip, including an extraction unit, a determination unit, and an analysis unit. The extraction unit extracts a multiple-input cell receiving two or more activation paths if there are a plurality of activation paths on which a signal propagates during the delay test. The determination unit determines whether there is a possibility of occurrence of a multiple-input switching, based on an input timing of each signal to the multiple-input cell on the two or more activation paths, for the multiple-input cell extracted by the extraction unit. The analysis unit analyzes an occurrence situation of a multiple-input switching, as one delay cause, based on a determination result by the determination unit and a result of the delay test.

Another delay analysis apparatus of the present disclosure is a delay analysis apparatus that that analyzes a delay cause based on a result of a delay test on an actual chip, the apparatus comprising: a processor configured to execute a procedure, the procedure comprising: extracting a multiple-input cell receiving two or more activation paths if there are a plurality of activation paths on which a signal propagates during the delay test; determining whether there is a possibility of occurrence of a multiple-input switching, based on an input timing of each signal to the multiple-input cell on the two or more activation paths, for the extracted multiple-input cell; and analyzing an occurrence situation of a multiple-input switching, as one delay cause, based on a determination result by the determining and a result of the delay test.

A computer-readable recording medium of the present disclosure is a computer-readable non-transitory medium storing a delay analysis program that makes a computer execute a procedure, the procedure comprising: extracting a multiple-input cell receiving two or more activation paths if there are a plurality of activation paths on which a signal propagates during the delay test; determining whether there is a possibility of occurrence of a multiple-input switching, based on an input timing of each signal to the multiple-input cell on the two or more activation paths, for the extracted multiple-input cell; and analyzing an occurrence situation of a multiple-input switching, as one delay cause, based on a determined determination result and a result of the delay test.

A delay analysis method of the present disclosure is a delay analysis method that analyzes a delay cause based on a result of a delay test on an actual chip by means of a computer. In the method, a multiple-input cell receiving two or more activation paths is extracted if there are a plurality of activation paths on which a signal propagates during the delay test. Then whether there is a possibility of occurrence of a multiple-input switching is determined, based on an input timing of each signal to the multiple-input cell on the two or more activation paths, for the extracted multiple-input cell. Finally, an occurrence situation of a multiple-input switching is analyzed, as one delay cause, based on a determination result by the determining and a result of the delay test.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIGS. 12A and 12B depict definitions of each vector component of a characteristic vector set for each analysis target path for illustrating the analysis operation by the analysis unit of the delay analysis apparatus of the present embodiment, in which FIG. 12A is a diagram illustrating a first aspect thereof, while FIG. 12B is a diagram illustrating a second aspect thereof;

FIGS. 13A and 13B illustrate the analysis operation by the analysis unit of the delay analysis apparatus of the present embodiment, in which FIG. 13A is a diagram illustrating a concrete example of the first aspect depicted in FIG. 12A, while FIG. 13B is a diagram illustrating a concrete example of the second aspect depicted in FIG. 12B;

FIGS. 14A and 14B illustrate the analysis operation by the analysis unit of the delay analysis apparatus of the present embodiment, in which FIG. 14A is a diagram illustrating an example of the circuit configuration of the concrete example of the first aspect depicted in FIG. 13A, while FIG. 14B is a diagram illustrating an example of the circuit configuration of the concrete example of the first aspect depicted in FIG. 13B;

FIG. 17 is a drawing illustrating an example of circuit configuration on a test target actual chip for illustrating a typical delay test.

DESCRIPTION OF THE PREFERRED EMBODIMENTS

Hereunder is a description of embodiments with reference to the drawings.

(1) Structure of Delay Analysis Apparatus of the Present Embodiment

Figure 1:
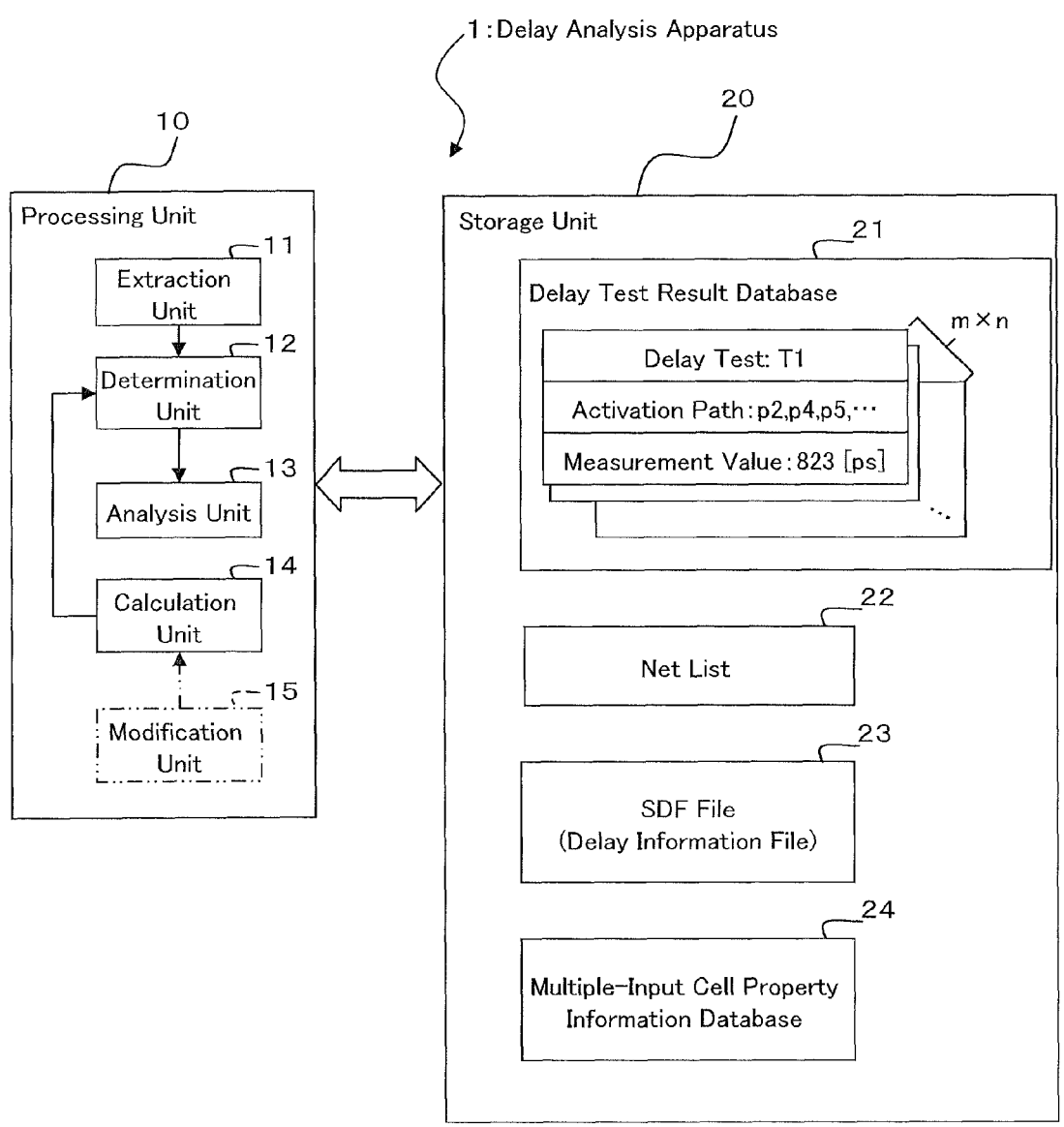
FIG. 1 is a block diagram illustrating a functional structure of a delay analysis apparatus of a present embodiment.

FIG. 1 is a block diagram illustrating a functional structure of the delay analysis apparatus 1 of the present embodiment.

The delay analysis apparatus 1 depicted in FIG. 1 is constructed from a computer, such as a general-purpose personal computer, and includes a processing unit 10 and a storage unit 20, as well as a man-machine interface (not illustrated) that is manipulated by a designer for entering various pieces of information to the apparatus 1. Note that the processing unit 10 may be a central processing unit (CPU) or the like, and the storage unit 20 may be an internal storage apparatus or an external storage apparatus, such as an RAM (Random Access Memory), an ROM (Read Only Memory), a hard disk, and the like.

The processing unit 10 functions as an extraction unit 11, a determination unit 12, an analysis unit 13, and a calculation unit 14, which will be described later, by executing a delay analysis program. In addition, the processing unit 10 functions as a modification unit 15, which will be described later, by executing the delay analysis program, when necessary.

In addition, the storage unit 20 stores a delay test result database 21, a net list 22, an SDF (Standard Delay Format) file 23, and a multiple-input cell property information database 24, which will be described later, and also stores various pieces of information, for example, a threshold value X and a coefficient k, which will be described later, set by a designer.

Figure 16:
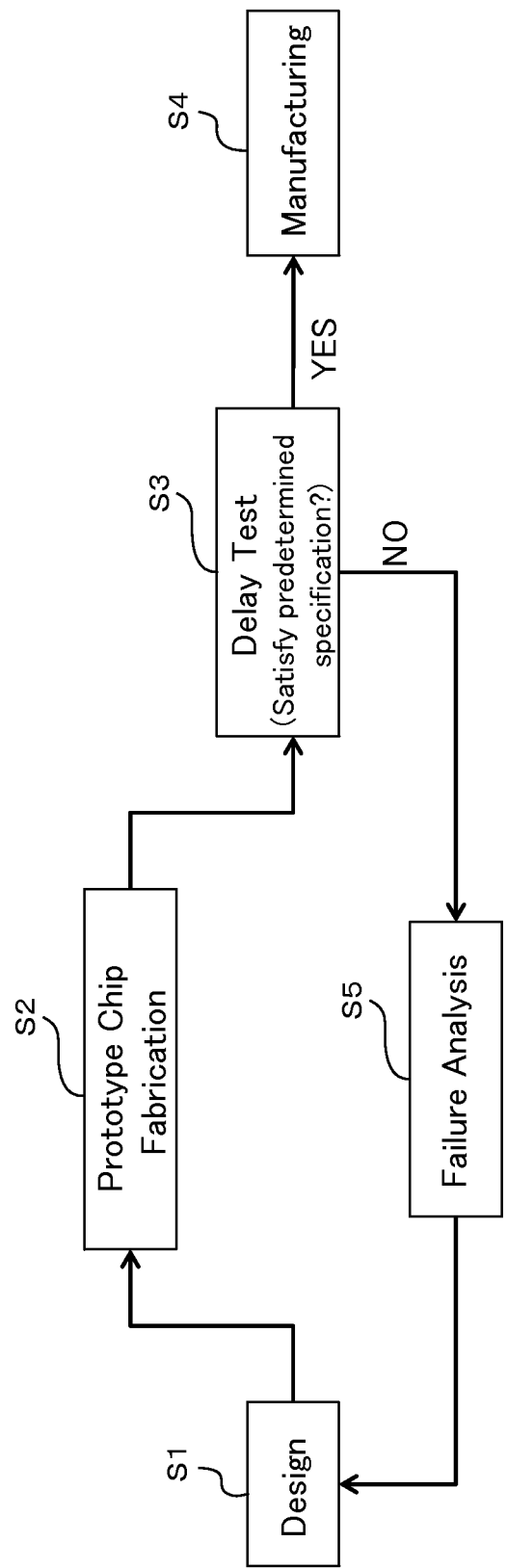
FIG. 16 is a flowchart schematically illustrating a typical design and manufacturing procedure of chip, including a delay test.

The delay analysis apparatus 1 is adapted to analyze a delay cause based on a result of delay test on an actual chip. The result of this delay test is obtained in the procedure that which has been described above with reference to FIG. 16 and FIG. 17, and is stored in a delay test result database 21 in the storage unit 20. Here, for statistical analysis, n types of delay tests are carried out on m actual chips that are generated based on an identical net list 22, thereby obtaining m×n delay test results, where m and n are natural numbers.

Each delay test result stored in the database 21 includes at least following three pieces of data (a1)-(a3) depicted in FIG. 1.

(a1) An identifier for identifying each delay test. See "T1" in FIG. 1, for example.

(a2) An identifier for identifying a path activated in each delay test. See "p2, p4, p5, . . . " in FIG. 1, for example.

(a3) A measurement value of each delay test obtained in that delay time. In other words, a measurement value of the time a signal to reach from an input-side FF 101 to an output-side FF 102 in an activation path on an actual chip. See "823 (ps)" in FIG. 1, for example.

A net list 22 is obtained by a design (Step S1 in FIG. 16), and stores information on circuit elements, such as cell, on a current design target chip, connection information between terminals, including cell connections.

Figure 18B:
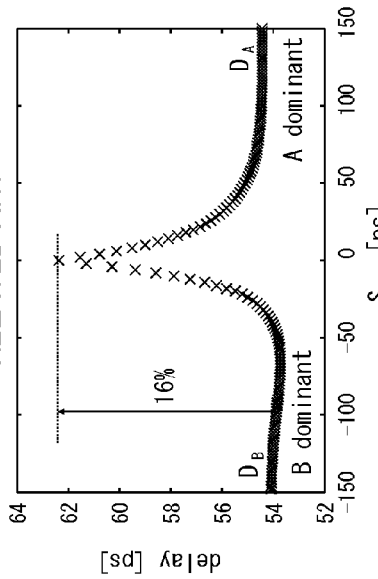
FIGS. 18A to 18D are drawings illustrating a multiple-input switching.
Figure 18D:
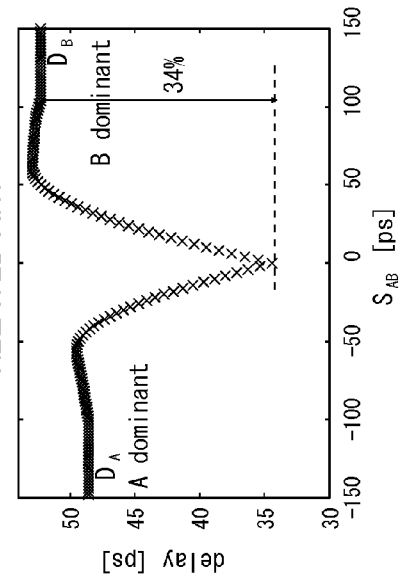
Figure 18A:
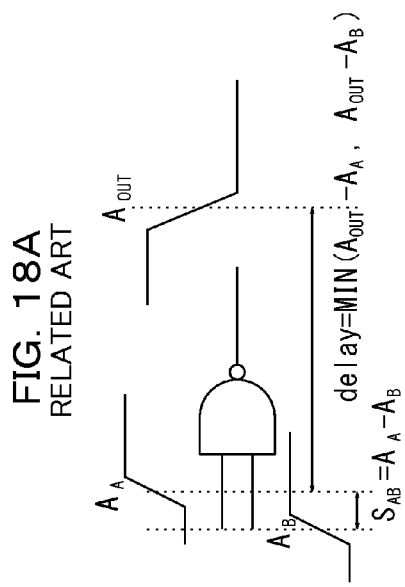
Figure 18C:
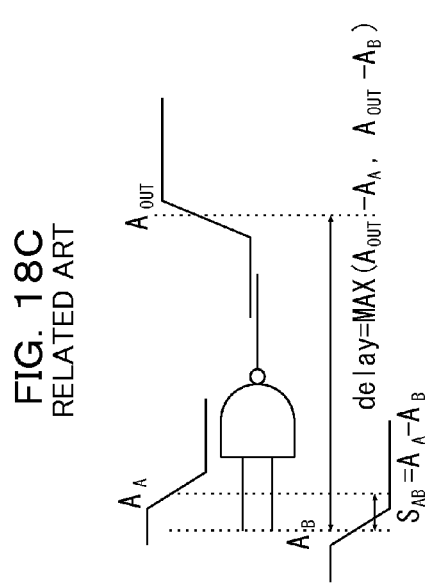

An SDF file (delay information file) 23 stores delay information of circuit elements, including multiple-input cell on the actual chip, that is, a prediction value or a prediction range of the time from when a signal is entered into a cell to when the signal is output from that cell for each type of cell (cell type), as delay information. Such a prediction value and a prediction range are calculated in advance by a simulation tool or the like, based on design information of each cell. Here, the prediction value is an average, generally referred to as a typical value. In addition, the prediction range is defined by an upper limit (max) and a lower limit (min) of the prediction value. Here, for a multiple-input cell that has a possibility to experience a multiple-input switching noise, which has been described with reference to FIG. 18A to FIG. 18D, a value corresponding to the assumed value $D_A$ or $D_B$ depicted in FIG. 18B and FIG. 18D are calculated as a prediction value or prediction range, and stored in the SDF file 23.

A multiple-input cell property information database 24 stores information on a property of a multiple-input cell that has a possibility to experience a multiple-input switching noise (hereinafter, referred to as "property information"). The property information is information indicating a relationship between a transition direction of an output signal upon occurrence of a multiple-input switching noise and an increase or decrease of the delay time. That is, the property information is information on whether the delay time increases or decreased when an output signal transitions from "0" to "1" when a multiple-input switching noise occurs, or information on whether the delay time increases or decreased when an output signal transitions from "1" to "0" in the opposite direction when a multiple-input switching noise occurs. More specifically, in the case of the NAND gate depicted in FIG. 18A to FIG. 18D, the delay time decreases when an output signal transitions from "0" to "1" when a multiple-input switching noise occurs, whereas the delay time increases when the output signal transitions from "1" to "0". Accordingly, information, such as "the delay time increases upon a rising edge of an output signal" or "the delay time decreases upon a falling edge of an output signal", as the property information of that NAND gate. Such property information is obtained by actually observing multiple-input cells in advance, and is stored in a database 24.

In addition, a threshold value X and a coefficient k, which will be described later, set by a designer in advance, and used in determination processing and modification processing, are also stored in the storage unit 20. Here, the threshold value X is used in determination processing by the determination unit 12, as will be described later with reference to FIG. 3 to FIG. 11. The coefficient k is used in modification processing of a prediction value by the determination unit 12, as will be described later with reference to FIG. 7 to FIG. 11. The coefficient k is determined and set by a designer in advance, in accordance with the increase rate or decrease rate of delay time when a multiple-input switching occurs (see FIG. 18B and FIG. 18D). Accordingly, the coefficient k may be stored in the database 24 as property information of a multiple-input cell.

The extraction unit 11 extracts a multiple-input cell receiving two or more activation paths, i.e., multiple-input cell activated by the two or more input path, if there are a plurality of activation paths on which a signal propagates during a delay test. Specific functions and operations of the extraction unit 11 will be described later with reference to FIG. 2 and FIG. 4.

Figure 2:
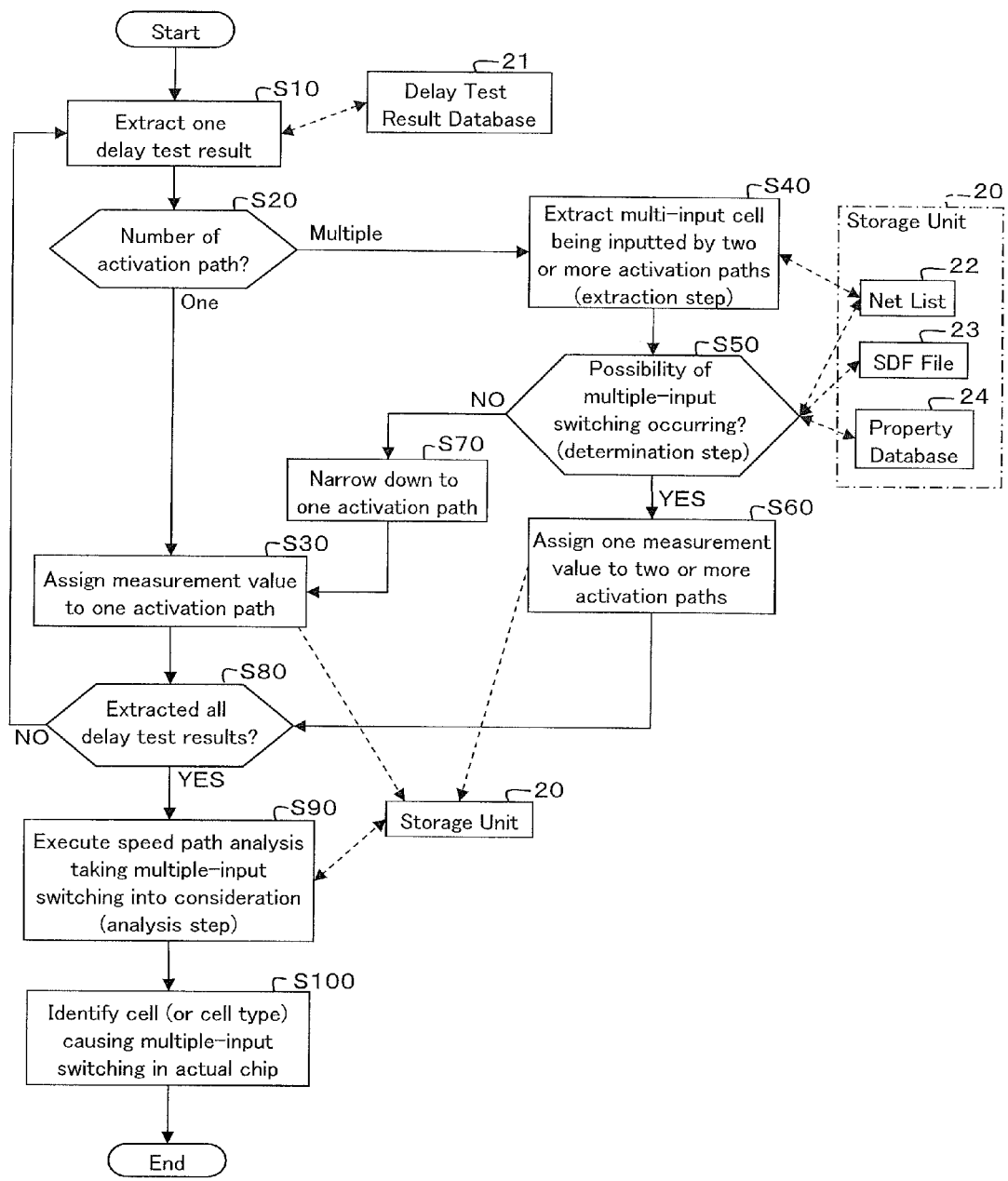
FIG. 2 is a flowchart illustrating the overall processing flow in the delay analysis apparatus of the present embodiment.

The determination unit 12 determines whether there is a possibility of occurrence of a multiple-input switching based on an input timing of each signal to a multiple-input cell on two or more activation paths, for a multiple-input cell extracted by the extraction unit 11, and the threshold value X. The determination unit 12, if determining that there is a possibility of occurrence of a multiple-input switching on the multiple-input cell, identifies the two or more activation paths inputting to the multiple-input cell, as two or more target paths. The determination unit 12 then assigns a measurement value of a delay time obtained during the delay test (for example, 823 (ps) or the like in FIG. 1) to the identified two or more target paths. Furthermore, the determination unit 12 notifies the analysis unit 13 of information on the two or more target paths, i.e., identifiers identifying each of the paths (for example, p2, p4, p5, . . . , in FIG. 1), measurement values assigned to the paths, and information on a possibility of occurrence of a multiple-input switching on the multiple-input cell, as a determination result. Such pieces of information may be directly sent from the determination unit 12 to the analysis unit 13, as depicted in FIG. 1, or may be indirectly sent to the analysis unit 13 via storage unit 20, as depicted in FIG. 2.

Here, the information on a possibility of occurrence of a multiple-input switching includes at least binary information of 1 or 0, indicating whether or not there is a possibility of occurrence, and the above-described input timing used upon calculating a value (which will be described later) in accordance with the magnitude the possibility of occurrence. Specific functions and operations of the determination unit 12 will be described later with reference to FIG. 2 to FIG. 11. Note that, in this embodiment, the above-described input timing used in the determination unit 12 is a prediction value or prediction range of a delay time calculated by a calculation unit 14, which will be described later, and modified by a modification unit 15, which will be described later, when necessary.

The analysis unit 13 analyzes an occurrence situation of a multiple-input switching in an actual chip, as one delay cause, based on information including the following (b1) to (b4), including a determination result by the determination unit 12 and a result of a delay test. Specific functions and operations of the analysis unit 13 will be described later with reference to FIG. 12 to FIG. 15.

(b1) A plurality of analysis target paths including two or more target paths. Specifically, the identifiers identifying the analysis target paths.

(b2) Information on a possibility of occurrence of a multiple-input switching on the multiple-input cell on these analysis target paths. The information is related to the identifiers identifying the analysis target paths. In addition, the information is a determination result by the determination unit 12, and includes binary information indicating whether or not there is a possibility of occurrence, as set forth above. The information includes the above-described input timing, if a value in accordance with the magnitude the possibility of occurrence (which will be later) is calculated.

(b3) A measurement value assigned to each analysis target path obtained during the above-described delay test. Hereinafter, a measurement value of a delay time on an actual chip of a path p may be referred to as "d_silicon(p)".

(b4) A prediction value of a delay time that is calculated in advance by a simulation tool or the like, and obtained for each analysis target path. Hereinafter, a prediction value of the path p may be referred to as "d_predict(p)".

The calculation unit 14 calculates the above-described input timing used upon a determination operation by the determination unit 12, based on information stored the net list 22 and the SDF file 23. As the input timing, a prediction value or prediction range of a delay time from an input-side FF of each signal to a multiple-input cell is calculated. The calculation unit 14 obtains, from the net list 22, a circuit element existing on a path from the input-side FF of each signal to the multiple-input cell, and obtains delay information of the obtained circuit element from the SDF file 23. The calculation unit 14 then calculates a prediction value or prediction range by adding the obtained delay information and a delay value in accordance with the wiring length between circuit elements.

Note that, if the prediction value is calculated as an input timing, the calculation unit 14 obtains a typical value (average) of a delay time of each circuit element as delay information, from the SDF file 23.

In addition, if the prediction range is calculated as the input timing, the calculation unit 14 obtains the upper limit (max) and the lower limit (min) defining a prediction range of a delay time of each circuit element as the delay information, from the SDF file 23. In this case, the calculation unit 14 calculates the upper limit of the prediction range of a delay time to the multiple-input cell by adding the upper limits of each circuit element, while calculating the lower limit of the prediction range of a delay time to the multiple-input cell by adding the lower limits of each circuit element.

The modification unit 15 determines whether not another multiple-input cell (second multiple-input cell), which is determined that there is a possibility of occurrence of a multiple-input switching, exists on the activation path from the signal input-side to the multiple-input cell. If the second multiple-input cell exists, the modification unit 15 modifies the prediction value or prediction range calculated by the calculation unit 14, based on the property of second multiple-input cell from the database 24, the prediction value of the delay time of the second multiple-input cell obtained from the SDF file 23, and the coefficient k. Specific functions and operations of the modification unit 15 will be described later with reference to FIG. 7 to FIG. 11.

(2) Functions and Operation of Delay Analysis Apparatus of the Present Embodiment Next, specific functions and operations of the delay analysis apparatus 1 of the present embodiment, which is constructed as described above, will be described with reference to FIG. 2 to FIG. 15.

(2-1) Flow of Overall Processing

Firstly, the flow of overall processing in the delay analysis apparatus 1 will be described, with reference to the flowchart (Steps S10 to S100) depicted in FIG. 2.

In the delay analysis apparatus 1, one delay test result is extracted by the processing unit 10 from the delay test result database 21 in the storage unit 20 (Step S10), and processing of the following Steps S20 to S70 will be executed to the delay test result.

It is determined by the processing unit 10 whether there are one or more activation paths in the extracted one delay test result (Step S20). If there is one, the processing unit 10 assigns a measurement value obtained in the delay test to that one activation path, and registers this fact to the storage unit 20 (Step S30).

Thereafter, the processing unit 10 extracts all delay test results from the delay test result database 21, and determines whether or not the processing in the Steps S20 to S70 is executed on all delay test results. If there is any unprocessed delay test result (the NO route in Step S80), the processing unit 10 returns to the processing in Step S10. On the other hand, if the processing is executed on all delay tests (the YES route in Step S80), the processing unit 10 transitions to the processing in Step S90.

If the number of activation paths in the extracted one delay test result is two or greater, multiple-input cell receiving two or more activation paths, i.e., multiple-input cell activated by the two or more input paths, are extracted (Step S40; extraction step). At this stage, the extraction unit 11 identifies each activation path by making reference to the identifier included in the delay test result, and performs a backforward trace on the identified each activation path from output-side FF, based on the net list 22. Thereby, the multiple-input cell activated by the two or more input paths is extracted.

Then, whether or not a possibility of occurrence of a multiple-input switching for the multiple-input cell extracted in Step S40 is determined by the determination unit 12 (Step S50; determination step). One of first to fourth aspects, which will be described later, is applied as a determination operation executed in Step S50.

If it is determined by the determination unit 12 that there is a possibility of occurrence of a multiple-input switching on the multiple-input cell (the YES route in Step S50), the two or more activation paths inputting to the multiple-input cell are identified, as two or more target paths. A measurement value of a delay time obtained in the delay test is assigned to the identified two or more target paths, by the determination unit 12, and this fact is registered to the storage unit 20 (Step S60). Thereafter, the processing unit 10 transitions to the processing in Step S80.

On the other hand, if it is determined that there is no possibility of occurrence of a multiple-input switching in the multiple-input cell (the NO route in Step S50), the processing unit 10 narrows down the two or more activation paths receiving the multiple-input cell to one (Step S70). This narrowing down is performed by selecting one activation path having the maximum delay time from the two or more activation paths. At this stage, the prediction value or prediction range of the delay time from the input-side FF to the multiple-input cell for each activation path is calculated by the calculation unit 14, in Steps S51 and S51a in FIG. 3, FIG. 5, FIG. 8, and FIG. 10, as will be described later. The above-described narrowing down is performed based on the prediction value or prediction range of the delay time calculated by the calculation unit 14. The processing unit 10 assigns the measurement value obtained in this delay test to the one narrowed-down activation path, registers the fact to the storage unit 20 (Step S30), and transitions to the processing in Step S80.

Once the processing in Steps S20 to S70 is performed to all delay tests result (the YES route in Step S80), a speed path analysis taking a multiple-input switching into consideration is executed in the analysis unit 13 (Step S90; analysis step). At this stage, an occurrence situation of a multiple-input switching in the actual chip is analyzed as one delay cause, based on the information of the above-described (b1) to (b4). Then, a cell unit or cell type causing the multiple-input switching is identified in the actual chip, based on the analysis result (Step S100). The analysis operations of the analysis unit 13 will be described later in Section (2-3) with reference to FIG. 12 to FIG. 15.

(2-2) Functions and Operations of Determination Unit, Calculation Unit, and Modification Unit Next, processing in Step S50 in FIG. 2, i.e., the functions and operations of the determination unit 12, the calculation unit 14, and the modification unit 15 will be described with reference to FIG. 3 to FIG. 11. Note that, since no modification processing of a prediction value or prediction range is performed in a first aspect and a second aspect of the determination operation which will be described later, the function of the modification unit 15 is not required. In addition, since modification processing of a prediction value or prediction range is performed in a third aspect and a fourth aspect of the determination operation which will be described later, the function of the modification unit 15 is required.

(2-2-1) First Aspect of the Determination Operation

Figure 3:
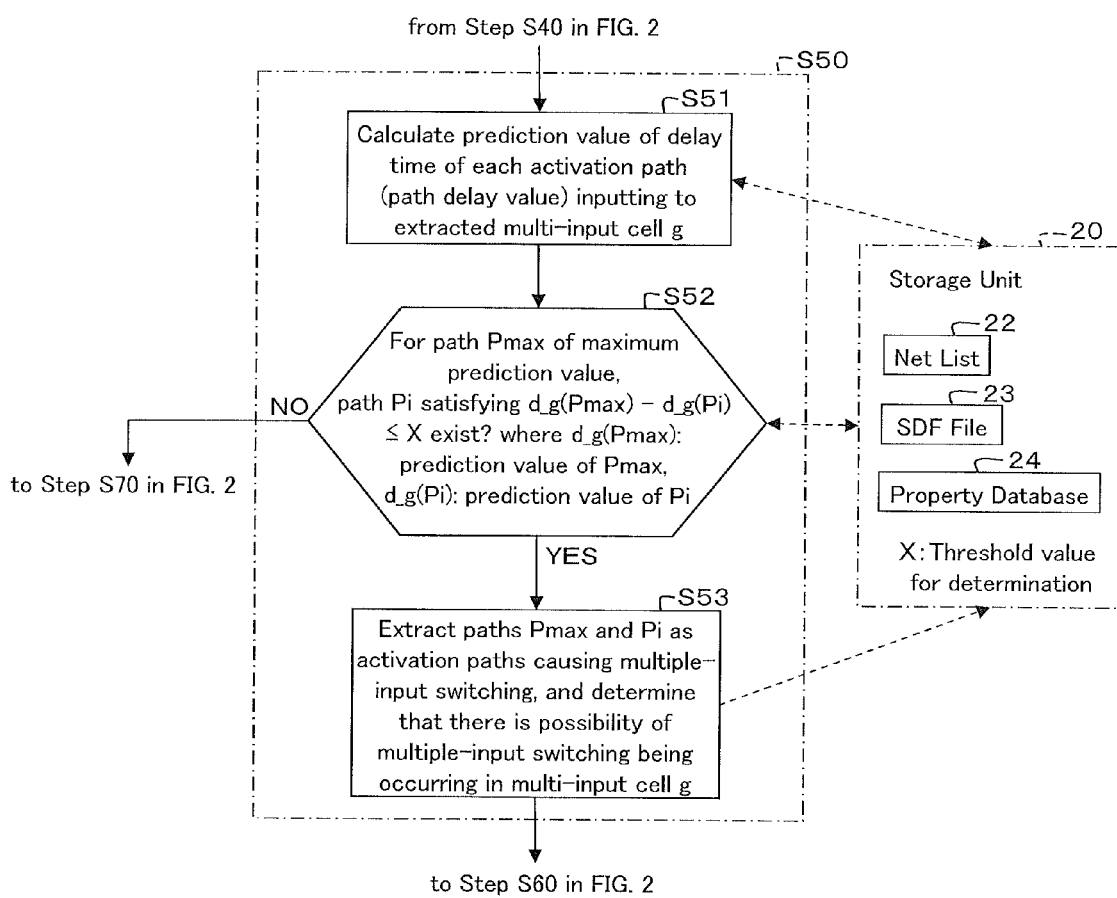
FIG. 3 is a flowchart illustrating a first aspect of a determination operation by a determination unit of the delay analysis apparatus of the present embodiment.

A first aspect of the determination operation by the determination unit 12 of this embodiment will be described with reference to the flowchart depicted in FIG. 3 (Steps S51 to S53). Note that FIG. 4 is a drawing illustrating the first aspect of the determination operation by the determination unit 12 of the present embodiment.

First in Step S51, a prediction value of a delay time of each activation path inputting to the multiple-input cell g extracted in Step S40 in FIG. 2 is calculated by the calculation unit 14, as a path delay value. At this stage, the calculation unit 14 obtains, from the SDF file 23, the typical value (average) of the delay time of a circuit element on a activation path to the extracted multiple-input cell, as delay information. The prediction value of the delay time of each activation path is then calculated by adding the typical value of the circuit element and a delay value in accordance with the wiring length between circuit elements.

Figure 4:
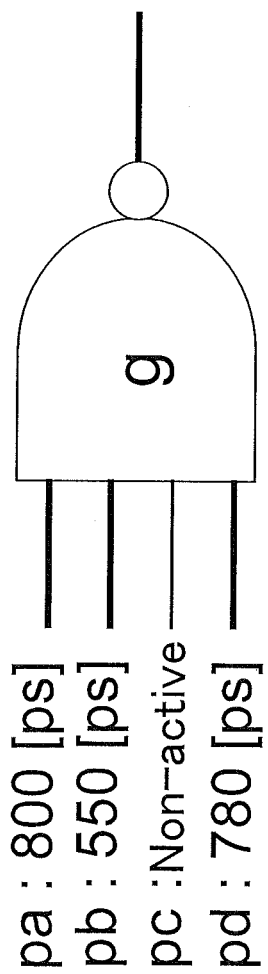
FIG. 4 is a drawing illustrating the first aspect of the determination operation by the determination unit of the delay analysis apparatus of the present embodiment.

In FIG. 4, a 4-input NAND gate is depicted as one example of a multiple-input cell g extracted in Step S40. In the NAND gate g depicted in FIG. 4, three input paths pa, pb, and pd are activated of four input paths pa to pd, while only the input path pc is inactive. In FIG. 4, activation paths are drawn in thick lines. For each of the input paths pa, pb, and pd, prediction values d_g(pa), d_g(pb), and d_g (pd) of the delay time to the multiple-input cell g are calculated by the calculation unit 14. In FIG. 4, d_g(pa)=800 (ps), d_g(pb)=550 (ps), and d_g (pd)= 780 (ps).

Then in Step S52, the determination unit 12 compares the maximum prediction value d_g(Pmax) of the two or more prediction values calculated by the calculation unit 14 and each prediction value d_g(Pi) other than the maximum prediction value, and determines whether not a prediction value exists which has a difference from the predetermined value X within a maximum prediction value. In other words, the determination unit 12 determines whether not a path Pi exists satisfying the following formula (1), for the path Pmax having the maximum prediction value of the path delay to the gate g. The predetermined value X is a threshold value that is set in the storage unit 20 by a designer or the like, as described above.

$$d\_g(Pmax)-d\_g(Pi) \geq X \quad (1)$$

In the example depicted in FIG. 4, the path Pmax having the maximum prediction value is the input path pa, and d_g (Pmax)=d_g(pa)=800 (ps). Assuming that the threshold value X is 30 (ps), for example, the input path pd having a prediction value d_g(Pi)=d_g (pd)=780 (ps) exists, as the input path Pi satisfying the above-described formula (1).

If an input path Pi satisfying the above-described formula (1) exists (the YES route in Step S52), the paths Pmax and Pi (path pa and pd in the example depicted in FIG. 4) are identified and extracted as activation paths (target paths) of an occurrence cause of a multiple-input switching. In addition, it is determined that there is a possibility of occurrence of a multiple-input switching in the gate g (Step S53).

At this stage, as the information on a possibility of occurrence of a multiple-input switching in the gate g, a value "1" indicating a possibility of occurrence of a multiple-input switching is output. In addition, when necessary, delay prediction values d_g(Pmax) and d_g(Pi) of the target paths Pmax and Pi to the cell g, or their difference value d_g (Pmax)−d_g(Pi), is also output. These delay prediction values are used when calculating and setting a characteristic value of a possibility of occurrence of a multiple-input switching in a multiple-input cell in the analysis unit 13.

After executing the processing in Step S53, the processing unit 10 transitions to the processing in Step S60 in FIG. 2, wherein the measurement value of the one delay time obtained in the delay test is assigned to the two or more target paths Pmax and Pi by the determination unit 12, and this fact is registered in the storage unit 20. In addition, if there is no path Pi satisfying the above-described formula (1), it is determined that there is no possibility of occurrence of a multiple-input switching in the gate g (the NO route in Step S52). The processing unit 10 transitions to the processing in Step S70 in FIG. 2, wherein it narrows the two or more target paths Pmax and Pi input to the gate g down to one path.

As described above in the first aspect of the determination operation, whether or not there is a possibility of occurrence of a multiple-input switching in the gate g is determined in the determination unit 12, based on the above-described formula (1). If there is a path satisfying the above-described formula (1), two or more activation paths exist which have the same or substantially same delay prediction value corresponding to the input timing of a signal at the gate g. As described above with reference to FIG. 18B and FIG. 18D, the phenomenon in which the output delay time is increased or reduced when two or more input signals are simultaneous or substantially simultaneous input in a gate g, i.e., a possibility of occurrence of a multiple-input switching, is high, as described above. Accordingly, the determination unit 12 can reliably determine whether or not there is a possibility of occurrence of a multiple-input switching in the gate g by making a determination based on the above-described formula (1).

(2-2-2) Second Aspect of the Determination Operation

Figure 5:
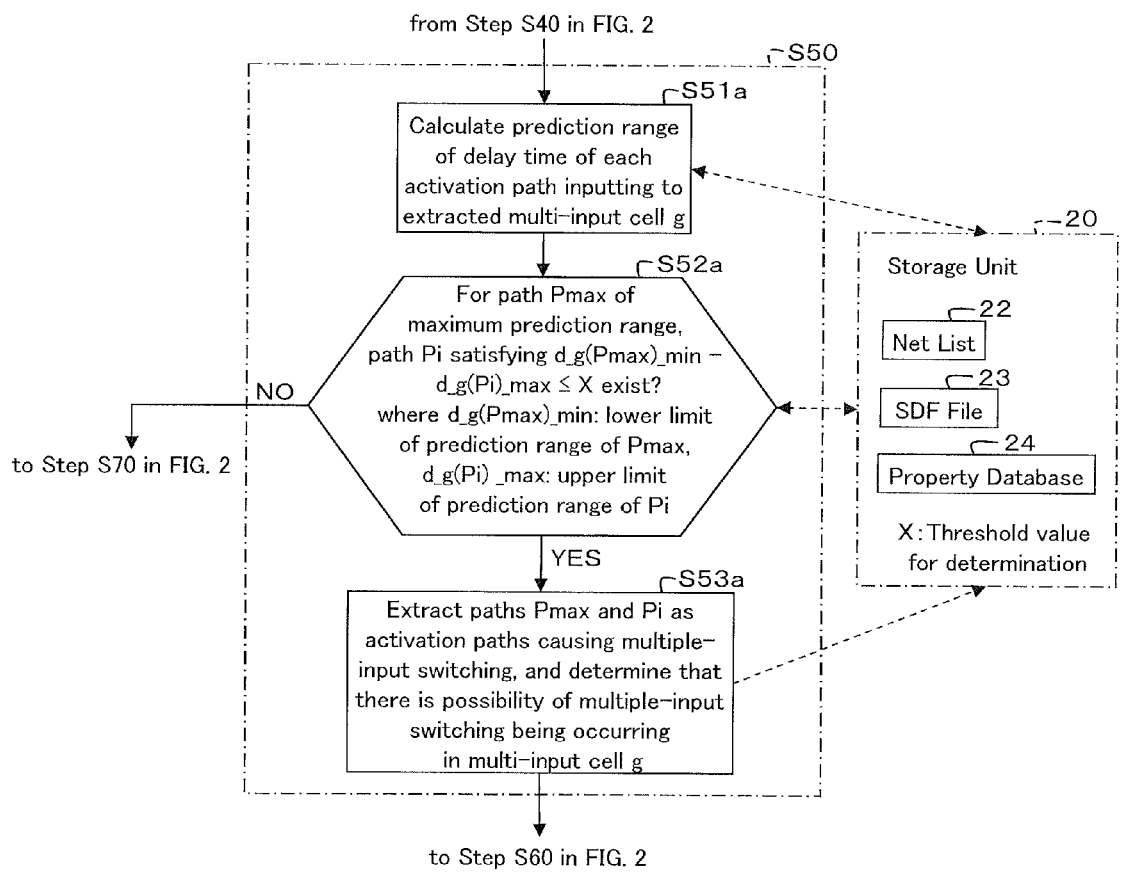
FIG. 5 is a flowchart illustrating a second aspect of a determination operation by a determination unit of the delay analysis apparatus of the present embodiment.

A second aspect of the determination operation by the determination unit 12 of this embodiment will be described with reference to the flowchart depicted in FIG. 5 (Steps S51a to S53a). Note that FIG. 6 is a drawing illustrating the second aspect of the determination operation by the determination unit 12 of the present embodiment.

First in Step S51a, a prediction range of a delay time of each activation path inputting to the multiple-input cell g extracted in Step S40 in FIG. 2 is calculated by the calculation unit 14, as a range of a path delay value. At this stage, the calculation unit 14 obtains, from the SDF file 23, the upper limit (max) and the lower limit (min) of the delay time of a circuit element on an activation path to the extracted multiple-input cell, as delay information. The upper limit of the prediction range of the delay time of each activation path is then calculated by adding the upper limit of the circuit element and a delay value in accordance with the wiring length between circuit elements. Similarly, the lower limit of the prediction range of the delay time of each activation path is calculated by adding the lower limit of the circuit element and a delay value in accordance with the wiring length between circuit elements. Thereby, the prediction range (upper limit and lower limit) of the delay time of each activation path is calculated.

Figure 6:
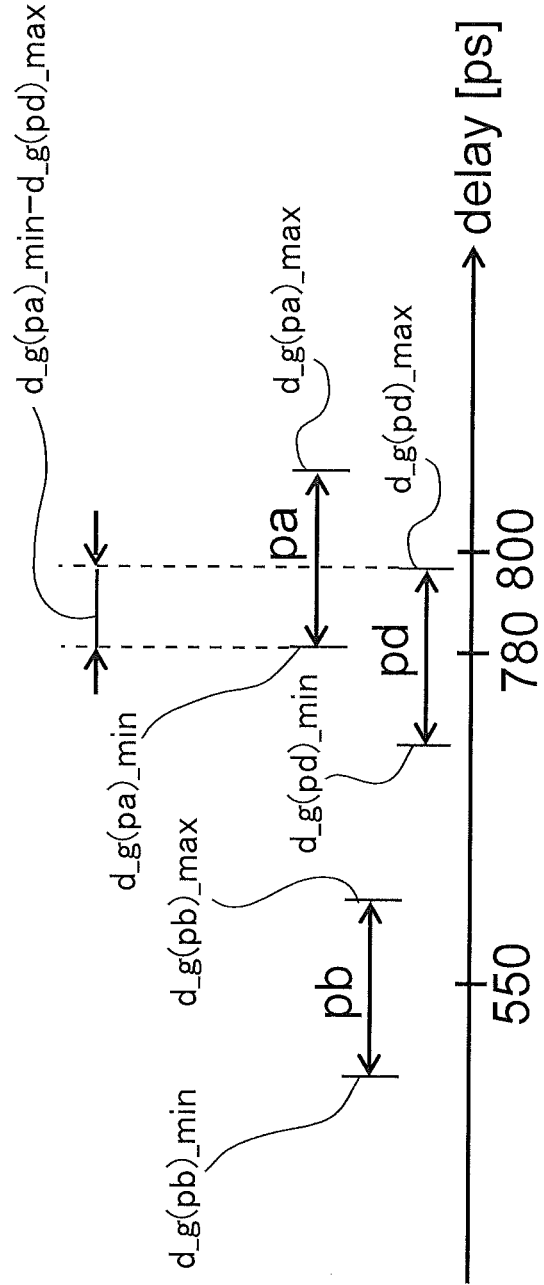
FIG. 6 is a drawing illustrating the second aspect of the determination operation by the determination unit of the delay analysis apparatus of the present embodiment.

In FIG. 6, a prediction range calculated on a 4-input NAND gate g, similar to that in FIG. 4, is depicted. Also in this case, three input paths pa, pb, and pd are activated of four input paths pa to pd, while only the input path pc is inactive. For each of the input paths pa, pb, and pd, prediction ranges of the delay time to the multiple-input cell g are calculated by the calculation unit 14, as depicted in FIG. 6. Note that the upper limit and the lower limit of the prediction range of an input path pi to the gate g are referenced to by d_g(pi)_max and d_g(pi)_min. In addition, the typical values of the delay times of the input paths pa, pb, and pd are 800 (ps), 550 (ps), and 780 (ps), similar to FIG. 4.

In Step S52a, the determination unit 12 compares the lower limit of the maximum prediction range of the two or more prediction ranges calculated by the calculation unit 14 with the upper limit of each prediction range other than that maximum prediction range. The determination unit 12 then determines whether a prediction range exists which has the upper limit having a difference with the upper limit of the maximum prediction range within the predetermined value X. In other words, the determination unit 12 determines whether a path Pi exists which satisfies the following formula (2), considering the upper limit (max) and lower limit (min) in the SDF file 23. The predetermined value X is a threshold value that is set in the storage unit 20 by a designer or the like, similar to the first aspect.

$$d\_g(P\max)\_\min - d\_g(Pi)\_\max \geq X \qquad (2)$$

Here, as the maximum prediction range, the one having the maximum typical value is selected, for example. Accordingly, in the example depicted in FIG. 6, the prediction range input path pa is the maximum prediction range. In other words, similar to the example depicted in FIG. 4, the path Pmax having the maximum prediction value is the input path pa, and the lower limit of the maximum prediction range d_g(Pmax)_min is d_g(pa)_min. Assuming that the threshold value X is 30 (ps), for example, the input path pd having an upper limit of a prediction range d_g(pd)_max exists, as the input path Pi satisfying the above-described formula (2).

If an input path Pi satisfying the above-described formula (2) exists (the YES route in Step S52a), the paths Pmax and Pi (paths pa and pd in the example depicted in FIG. 6) are identified and extracted as activation paths (target paths) of an occurrence cause of a multiple-input switching. In addition, it is determined that there is a possibility of occurrence of a multiple-input switching in the gate g (Step S53a). At this stage, similar to the first aspect, as the information on a possibility of occurrence of a multiple-input switching in the gate g, a value "1" indicating a possibility of occurrence of a multiple-input switching is output. In addition, when necessary, typical values of delay prediction values d_g(Pmax) and d_g(Pi) of the target paths Pmax and Pi to the cell g, or their difference value d_g(Pmax)−d_g(Pi), is also output.

After executing the processing in Step S53a, the processing unit 10 transitions to the processing in Step S60 in FIG. 2, wherein the measurement value of the one delay time obtained in the delay test is assigned to the two or more target paths Pmax and Pi by the determination unit 12, and this fact is registered in the storage unit 20. In addition, if there is no path Pi satisfying the above-described formula (2), it is determined that there is no possibility of occurrence of a multiple-input switching in the gate g (the NO route in Step S52a). The processing unit 10 transitions to the processing in Step S70 in FIG. 2, wherein it narrows the two or more target paths Pmax and Pi input to the gate g down to one path.

As described above in the second aspect of the determination operation, whether or not there is a possibility of occurrence of a multiple-input switching in the gate g is determined in the determination unit 12, based on the above-described formula (2). Since the lower limit of the maximum prediction range is compared against the upper limit of each prediction range other than the maximum prediction range, whether there is a possibility of occurrence of a multiple-input switching is determined under stricter conditions than in the above-described first aspect. Accordingly, more multiple-input cells having a possibility of occurrence of a multiple-input switching or activation paths causing a multiple-input switching can be found, and measurement values obtained in a delay test are assigned to the multiple activation paths that are found in this manner. Thus, as will be described later, in the analysis unit 13, an analysis taking a multiple-input switching in a multiple-input cell in an actual chip into consideration as actual chip as one delay cause can be made, using more pieces of information on the multiple-input switching.

(2-2-3) Third Aspect of the Determination Operation

In third and fourth aspects of the determination operation described below, a prediction value or prediction range calculated in Steps S51 and S51a in the above-described first and second aspects is modified by the modification unit 15, followed by determination by the determination unit 12.

First, the reasons why a prediction value or prediction range is modified by the modification unit 15 in the third and fourth aspects will be briefly described with reference to FIG. 7. Note that FIG. 7 is a drawing illustrating the third and forth aspects of the determination operation by the determination unit 12 of the delay analysis apparatus 1 of the present embodiment.

Figure 7:
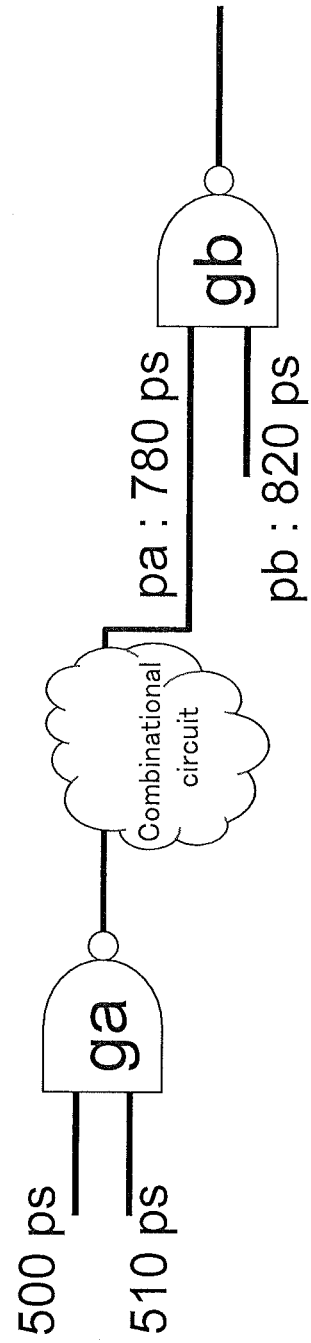
FIG. 7 is a drawing illustrating third and forth aspects of a determination operation by a determination unit of the delay analysis apparatus of the present embodiment.

In the example depicted in FIG. 7, on an activation path between an input-side FF and a NAND gate gb, which is a first multiple-input cell, there is a NAND gate ga, which is a second multiple-input cell, two input paths to the gate ga are activated, and delay prediction values to these paths are 500 (ps) and 510 (ps). In addition, two input paths pa and pb to the gate gb are also activated, and delay prediction values to these paths pa and pb are 780 (ps) and 820 (ps).

In this situation, if the first aspect of the determination operation is adopted for the threshold value X=30 (ps), it is determined that there is a possibility of occurrence of a multiple-input switching in the gate ga, while it is determined that there is no possibility of occurrence of a multiple-input switching in the gate gb located downstream to the gate ga.

The delay prediction values 500 (ps), 510 (ps), 780 (ps), and 820 (ps) for the path are respectively calculated by simply adding delay values of the circuit elements in the SDF file 23. Thus, any increases or decreases of the delay times (see FIG. 18B and FIG. 18D) caused by multiple-input switching are not considered at all in this calculation of the prediction values.

In the example depicted in FIG. 7, when there is a possibility of occurrence of a multiple-input switching in the gate ga, and when an output signal falls down at the gate ga, there is a possibility that the output delay time of the gate ga increases, as depicted in FIG. 18B. When such an increase in the output delay time is taken into consideration, the delay time of the input path pa in the gate gb (delay prediction value) actually increases, and the possibility of occurrence of a multiple-input switching in the gate gb is also increased.

For this reason, a modification unit 15 for provided for addressing the above situation and a delay prediction value or prediction range of each input path is modified by the modification unit 15 in the third and fourth aspects of the determination operation, as will be described later.

For modification of a prediction value or prediction range by the modification unit 15, determination result as of whether there is a possibility of occurrence of a multiple-input switching in other multiple-input cells at the input-side of the multiple-input cell. Thus, in the third and fourth aspects of the determination operation described later, after performing a backforward trace of activation paths from the output-side FF for extracting multiple-input gates to be determined in Step S70 in FIG. 2, a forward trace of activation paths from the input-side FF is executed. Then, whether there is a possibility of occurrence of a multiple-input switching is determined by the determination unit 12, for each path one by one, starting from the input-side multiple-input path.

Figure 8:
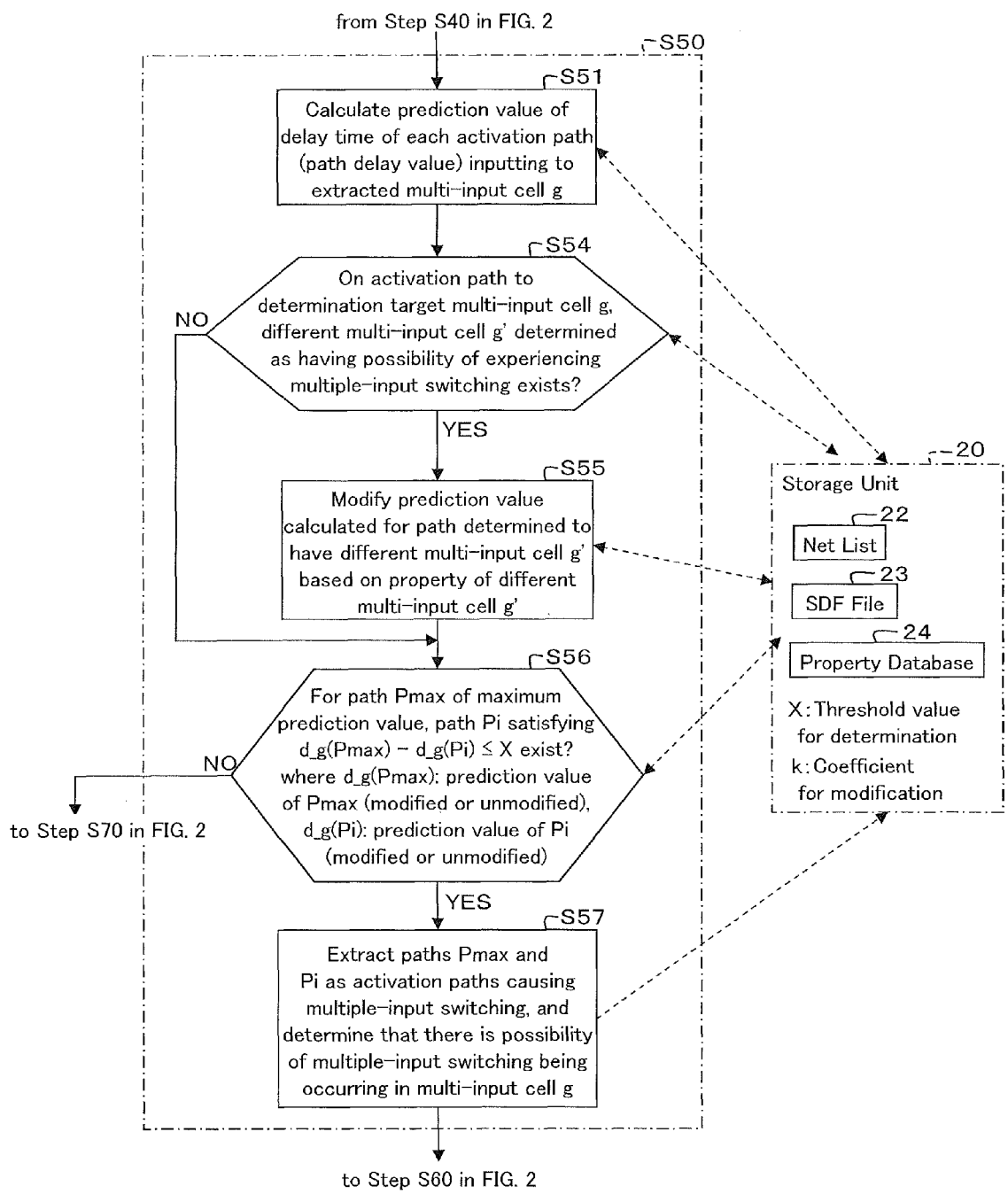
FIG. 8 is a flowchart illustrating the third aspect of the determination operation by the determination unit of the delay analysis apparatus of the present embodiment.
Figure 9:
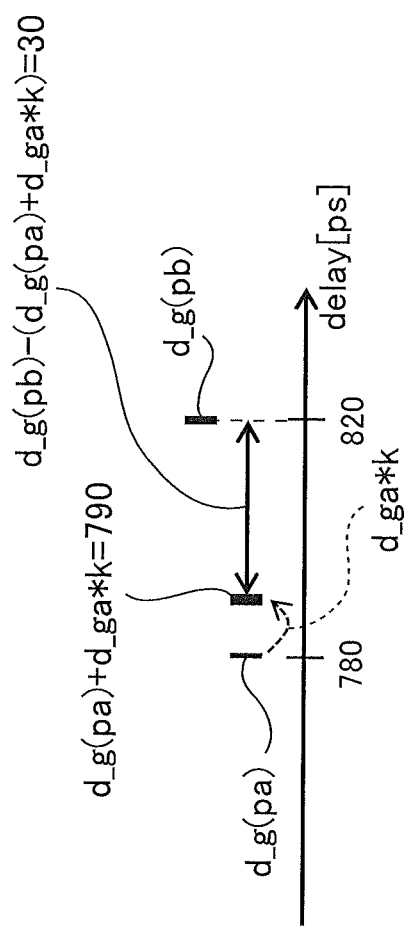
FIG. 9 is a drawing illustrating the third aspect of the determination operation by the determination unit of the delay analysis apparatus of the present embodiment.

Hereinafter, a third aspect of the determination operation by the determination unit 12 of this embodiment will be described with reference to the flowchart depicted in FIG. 8 (Steps S51, and S54 to S57). Note that FIG. 9 is a drawing illustrating the third aspect of the determination operation by the determination unit 12 of the delay analysis apparatus 1 of the present embodiment;

In this flowchart, the determination processing (Steps S51, and S55 to S57) on the gate ga has been completed, and the gate gb obtained in the forward trace of activation paths from the gate ga is to be determined. In other words, in Step S51, prediction values (typical values) of the delay times of each activation path inputting to the gate gb are calculated by the calculation unit 14 as path delay values. This calculation processing is similar to that in the first aspect depicted in FIG. 3, and the description thereof will be omitted. In this example, as depicted in FIG. 7 and FIG. 9, 780 (ps) and 820 (ps) are obtained in the calculation as delay prediction values $d\_g(pa)$ and $d\_g(pb)$ of the paths pa and pb.

Then in Step S54, the modification unit 15 determines whether or not another multiple-input cell g' exists which is determined to have a possibility of occurrence of a multiple-input switching on the activation path from the signal input side to the determination target gate gb, based on from the signal input side to the determination target gate gb registered in the storage unit 20. Note that the gate gb in FIG. 7 corresponds to the multiple-input cell g in FIG. 8, while the gate ga in FIG. 7 corresponds another multiple-input cell (second multiple-input cell) g' in FIG. 8.

If another multiple-input cell g' does not exist (the NO route in Step S54), the modification processing in Step S55 is skipped and the processing in Steps S56 and S57 is performed without modifying the prediction value. The processing in Steps S56 and S57 is similar to the processing in Steps S52 and S53 in FIG. 3, and the description thereof will be omitted.

On the other hand, if another multiple-input cell g', such as the gate ga depicted in FIG. 7 and FIG. 9 exists (the YES route in Step S54), the modification unit 15 modifies the delay prediction value $d\_g(pa)$ calculated the input path pa to which the gate ga is connected in Step S55.

At this time, the modification unit 15 reads, from the storage unit 20, the coefficient k that has been set in advance in the manner described above, and reads, from the specific information database 24, a property according to transition of the output signal of the gate ga, i.e., "the delay time increase at a falling edge of the output signal", for example, in this example. The modification unit 15 also reads a prediction value (typical value, in this example) $d\_ga$ of the delay time of the gate ga, from the SDF file 23.

The modification unit 15 then calculates $d\_ga*k$ as a value corresponding to the increase depicted in FIG. 18B, and modifies the delay prediction value $d\_g(pa)$ of the input path pa by adding the value $d\_ga*k$ to the delay prediction value $d\_g(pa)$ of the input path pa, as depicted in FIG. 9, in accordance with the above-described property.

Note that, if the property according to transition of the output signal of the gate ga, for example "the delay time reduces at a rising edge of the output signal", the modification unit 15 calculates $d\_ga*k$ as a value corresponding to the reduction depicted in FIG. 18D, and modifies the delay prediction value $d\_g(pa)$ of the input path pa by subtracting the value $d\_ga*k$ from the delay prediction value $d\_g(pa)$ of the input path pa.

In addition, the coefficient k is set in advance, in accordance with the increase rate or decrease rate of delay time when a multiple-input switching occurs (see FIG. 18B and FIG. 18D), as described before. The coefficient k may be set for each cell type, or may be set for each property stored in the specific information database 24.

If the prediction value of the delay time is modified as described above, the processing in Steps S56 and S57 is executed using the prediction value after the modification. The processing in Steps S56 and S57 is similar to the processing in Steps S52 and S53 in FIG. 3, except that the prediction value is modified, and the description thereof will be omitted.

Assuming that the prediction value $d\_ga$ of the delay time of the gate ga is 50 (ps) and the coefficient k is 0.2, $d\_ga*k=10$ (ps), for example, and the delay prediction value $d\_g(pa)$ of the input path pa=780 (ps) depicted in FIG. 9 is modified to 790 (ps). Assuming that the threshold value X is 30 (ps), with the delay prediction value $d\_g(pa)=780$ (ps) before the modification, the value of the above-described formula (1) is $d\_g(Pmax)-d\_g(Pi)=820-780=40$ (ps)$>30$ (ps), and accordingly, it is determined that there is no possibility of occurrence of a multiple-input switching in the gate gb. In contrast, when the delay prediction value $d\_g(pa)=790$ (ps) after the modification is used, the value of the above-described formula (1) is $d\_g(Pmax)-d\_g(Pi)=820-790=30$ (ps) $\leq 30$ (ps), and thus it is determined that there is a possibility of occurrence of a multiple-input switching in the gate gb.

As described above, in the third aspect of the determination operation, if the determination target gate gb is connected to the gate ga which has a possibility of occurrence of a multiple-input switching, and there is a possibility that it is affected by a multiple-input switching of the gate ga (see FIG. 7), a modification taking such a multiple-input switching into consideration is made to the delay prediction value. Accordingly, whether or not there is a possibility of occurrence of a multiple-input switching in the gate g is reliably determined in the determination unit 12, while taking a multiple-input switching of another multiple-input cell that is determined to have a possibility of occurrence of a multiple-input switching.

(2-2-4) Fourth Aspect of the Determination Operation

Figure 10:
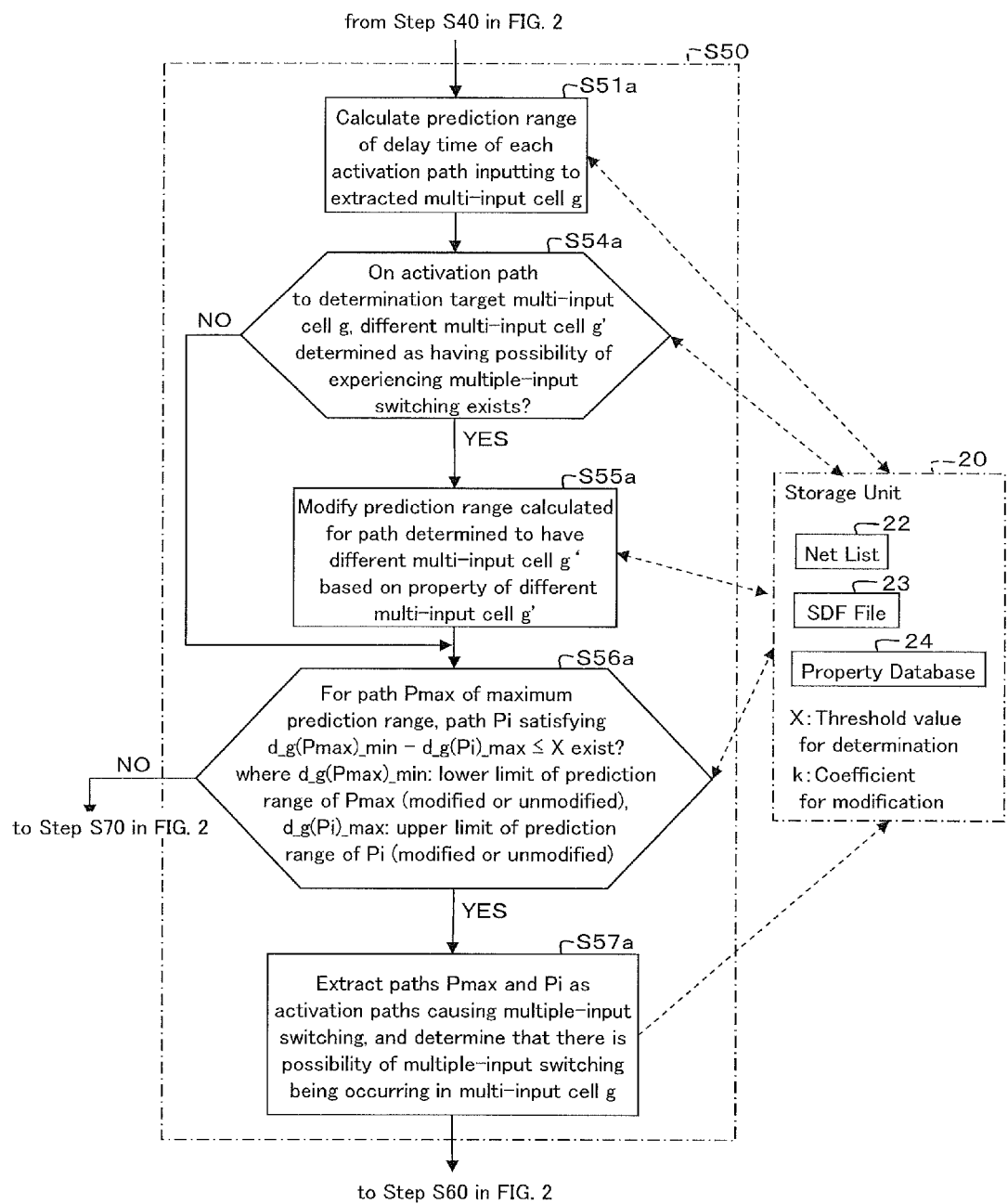
FIG. 10 is a flowchart illustrating the fourth aspect of the determination operation by the determination unit of the delay analysis apparatus of the present embodiment.
Figure 11:
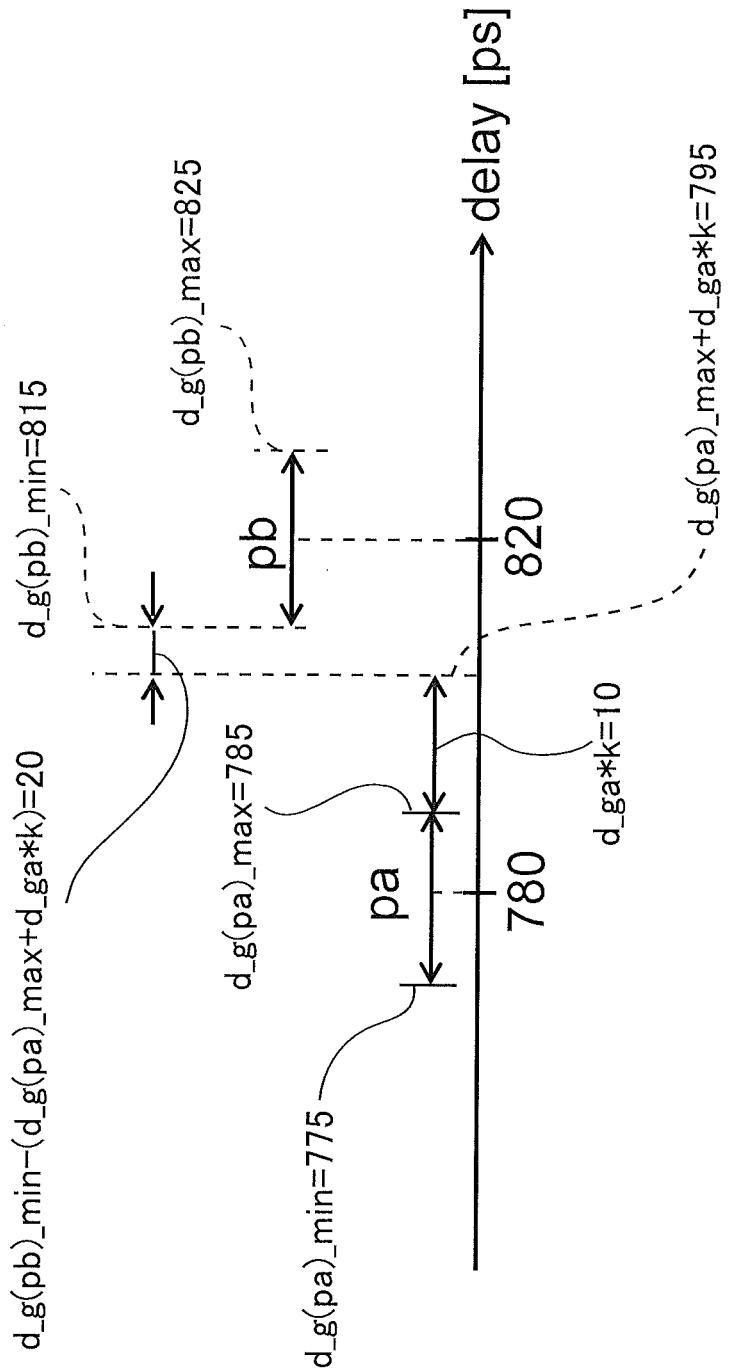
FIG. 11 is a drawing illustrating the forth aspect of the determination operation by the determination unit of the delay analysis apparatus of the present embodiment.

A fourth aspect of the determination operation by the determination unit 12 of this embodiment will be described with reference to the flowchart depicted in FIG. 10 (Steps S51a, S54a to S57a). Note that FIG. 11 is a drawing illustrating the fourth aspect of the determination operation by the determination unit 12 of the present embodiment.

In this flowchart, similar to the third aspect, the determination processing (Steps S51a, and S55a to S57a) on the gate ga has been completed, and the gate gb obtained in the forward trace of activation paths from the gate ga is to be determined. In other words, in Step S51a, a prediction range of the delay time of each activation path inputting to the gate gb is calculated by the calculation unit 14 as a path delay range. This calculation processing is similar to that in the second aspect depicted in FIG. 5, and it is not described. In this example, as depicted in FIG. 11, the upper limit d_g(pa)_max=785 (ps) and the lower limit d_g(pa)_min=775 (ps) of the range are obtained in the calculation as the delay prediction range of the path pa, and the upper limit d_g(pb)_max=825 (ps) and the lower limit d_g(pa)_min=815 (ps) of the range are obtained in the calculation as the delay prediction range of the path pb. Note that the typical values of delay times of the paths pa and pb are 780 (ps) and 820 (ps), as depicted in FIG. 7 and FIG. 11.

Then in Step S54a, similar to Step 54 in the third aspect, the modification unit 15 determines whether or not another multiple-input cell g' exists which is determined to have a possibility of occurrence of a multiple-input switching on the activation path from the signal input side to the determination target the gate gb, based on from the signal input side to the determination target the gate gb registered in the storage unit 20. Note that the gate gb in FIG. 7 corresponds to the multiple-input cell g in FIG. 10, while the gate ga in FIG. 7 corresponds another multiple-input cell (second multiple-input cell) g' in FIG. 10.

If another multiple-input cell g' does not exist (the NO route in Step S54a), the modification processing in Step S55a is skipped and the processing in Steps S56a and S57a is performed without modifying the prediction range. The processing in Steps S56a and S57a is similar to the processing in Steps S52a and S53a in FIG. 5, and the description thereof will be omitted.

On the other hand, if another multiple-input cell g', such as the gate ga depicted in FIG. 7 exists (the YES route in Step S54a), the modification unit 15 modifies the delay prediction range calculated the input path pa to which the gate ga is connected in Step S55a.

At this time, the modification unit 15 reads, from the storage unit 20, the above-described coefficient k, and reads, from the specific information database 24, a property according to transition of the output signal of the gate ga, i.e., "the delay time increase at a falling edge of the output signal", for example, in this example. The modification unit 15 also reads a prediction value (typical value, in this example) d_ga of the delay time of the gate ga, from the SDF file 23.

The modification unit 15 then calculates d_ga*k as a value corresponding to the increase depicted in FIG. 18B, and modifies the delay prediction range of the input path pa by adding the value d_ga*k to the upper limit d_g(pa)_max of the delay prediction range of the input path pa, as depicted in FIG. 11, in accordance with the above-described property.

Note that, if the property according to transition of the output signal of the gate ga, for example "the delay time reduces at a rising edge of the output signal", the modification unit 15 calculates d_ga*k as a value corresponding to the reduction depicted in FIG. 18D, and modifies the delay prediction range of the input path pa by subtracting the value d_ga*k from the lower limit d_g(pa)_min of the delay prediction range of the input path pa.

If the predictions range of the delay time is modified as described above, the processing in Steps S56a and S57a is executed using the prediction range after the modification. The processing in Steps S56a and S57a is similar to the processing in Steps S52a and S53a in FIG. 5, except that the prediction range is modified, and the description thereof will be omitted.

Assuming that the prediction value d_ga of the delay time of the gate ga is 50 (ps) and the coefficient k is 0.2, d_ga*k=10 (ps), for example, and the upper limit of d_g(pa)_max of the delay prediction range of the input path pa=785 (ps) depicted in FIG. 11 is modified to 795 (ps). Assuming that the threshold value X is 20 (ps), with the upper limit d_g(pa)_max of the delay prediction range=785 (ps) before the modification, the value of the above-described formula (2) is d_g(Pmax)_min−d_g(Pi)_max=815−785=30 (ps)>20 (ps), and accordingly, it is determined that there is no possibility of occurrence of a multiple-input switching in the gate gb. In contrast, when the upper limit d_g(pa)_max of the delay prediction range=795 (ps) after the modification is used, the value of the above-described formula (2) is d_g(Pmax)_min−d_g(Pi)_max=815−795=20 (ps)≤20 (ps), and thus it is determined that there is a possibility of occurrence of a multiple-input switching in the gate gb.

As described above, in the fourth aspect of the determination operation, if the determination target gate gb is connected to the gate ga which has a possibility of occurrence of a multiple-input switching, and there is a possibility that it is affected by a multiple-input switching of the gate ga (see FIG. 7), a modification taking such a multiple-input switching into consideration is made to the delay prediction range. Since a modification is made to expand delay prediction range, as depicted in FIG. 11, whether there is a possibility of occurrence of a multiple-input switching is determined under stricter conditions than in the above-described first to third aspects. Accordingly, more multiple-input cells having a possibility of occurrence of a multiple-input switching or activation paths that may cause a multiple-input switching can be found than in the first to third aspects, and measurement values obtained in a delay test are assigned to the multiple activation paths that are found in this manner. Thus, as will be described later, in the analysis unit 13, an analysis taking a multiple-input switching in a multiple-input cell in an actual chip into consideration as actual chip as one delay cause can be made, using more pieces of information on the multiple-input switching.

(2-3) Functions and Operations of Analysis Unit

Next, processing in Step S90 in FIG. 2, i.e., the functions and operations of the analysis unit 13 will be described with reference to FIG. 12 to FIG. 15. The analysis unit 13 of the present embodiment can make an analysis taking a multiple-input switching in a multiple-input cell in an actual chip into consideration as actual chip as one delay cause, by performing a speed path analysis as described below.

Figure 15:
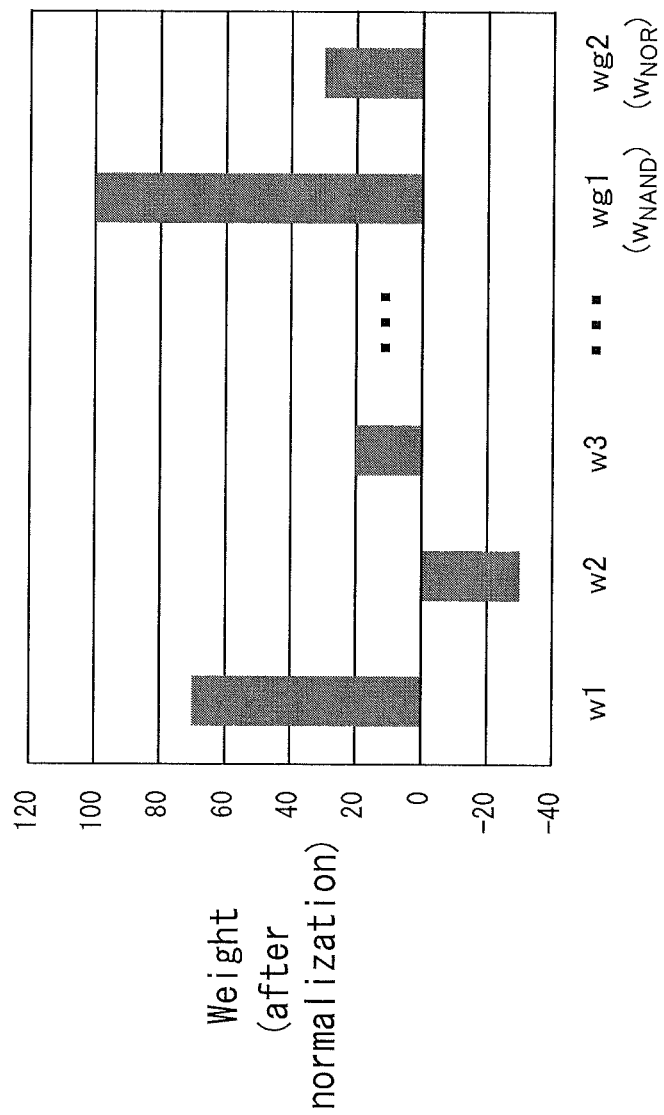
FIG. 15 is a diagram illustrating an example of an analysis result by the analysis unit of the delay analysis apparatus of the present embodiment.

FIGS. 12A and 12B depict definitions of each vector component of a characteristic vector set for each analysis target path, in which FIG. 12A is a diagram illustrating a first aspect thereof, while FIG. 12B is a diagram illustrating a second aspect thereof. In FIGS. 13A and 13B, FIG. 13A is a diagram illustrating a concrete example of the first aspect depicted in FIG. 12A, while FIG. 13B is a diagram illustrating a concrete example of the second aspect depicted in FIG. 12B. FIG. 14A is a diagram illustrating an example of the circuit configuration of the concrete example of the first aspect depicted in FIG. 13A, while FIG. 14B is a diagram illustrating an example of the circuit configuration of the concrete example of the first aspect depicted in FIG. 13B. FIG. 15 is a diagram illustrating an example of an analysis result by the analysis unit 13 of the present embodiment.

Firstly, "characteristics" in a speed path analysis of the analysis unit 13 in this embodiment will be described with reference to FIG. 12 to FIG. 14. In the speed path analysis, a characteristic of each path is represented by a vector. Herein, such a vector is referred to as a characteristic vector F. A characteristic vector F is set for each analysis target path, and the characteristic vector F of a path Pi is represented by F(Pi).

Each vector component of the characteristic vector F(Pi) is the value of the characteristic in the path Pi and is defined as a first aspect depicted in FIG. 12A or a second aspect depicted in FIG. 12B, for example. A plurality of characteristics included in the characteristic vector F(Pi) as vector components are a occurrence cause (delay cause) of difference Δd between a measurement value d_silicon(Pi) of delay time assigned to each analysis target path Pi and a prediction value of the delay time d_predict(Pi), as indicated in Formula (4), which will be described later.

In this embodiment, for considering a multiple-input switching as one delay cause during a speed path analysis by the analysis unit 13, information on a possibility of occurrence of a multiple-input switching is introduced as a new characteristic (vector component) into the characteristic vector F(Pi) of each path Pi. This new "characteristic" is referred to as a "suspicion of a multiple-input switching". Here, the definition of the new characteristic of "suspicion of a multiple-input switching" in the first aspect is different from that in the second aspect.

Before giving explanation of the definition of the characteristic of "suspicion of a multiple-input switching", other characteristics than the "suspicion of a multiple-input switching" will be described with reference to FIG. 12A and FIG. 12B. Other characteristics than the "suspicion of a multiple-input switching" in the first aspect are the same as those in second aspects, as depicted in FIG. 12A and FIG. 12B. Vector components f1_Pi to f5_Pi depicted in FIG. 12A and FIG. 12B are common characteristics, in which f1_Pi is the number of low-power transistors on the path Pi, and f2_Pi assumes "1" when the path Pi crossing a specified region 1, while it assumes "0" when not crossing the specified region 1. In addition, f2_Pi assumes "1" when the path Pi crossing a specified region 2, while it assumes 0" when not crossing the specified region 2, f4_Pi is a value related to the temperature condition of the pass region of the path Pi (e.g., a value becomes as the temperature increases), and f5_Pi is a value indicating the magnitude of the influence of a cross-talk noise of the path Pi.

In the first aspect depicted in FIG. 12A, FIG. 13A, and FIG. 14A, the characteristic of "suspicion of a multiple-input switching" is extracted as a value that indicate the possibility of occurrence of a multiple-input switching in respective multiple-input cells in the net list 22, and is extracted as the characteristics, the number of which corresponds to the number of multiple-input cells. In other words, as depicted in FIG. 12A, in the first aspect, multiple-input cells are distinguished from each other even for multiple-input cells of the same type, and characteristics fgj_Pi (j=1–x) for different "suspicion of a multiple-input switching" are provided for each multiple-input cell gj (j=1–x).

The characteristics fgj_Pi are provided as following (c1) and (c2):

(c1) Assumes "1" when a multiple-input cell gj (j=1–x) exists on the analysis target path Pi, and there is a possibility of occurrence of a multiple-input switching (or any other positive value according to the possibility)

(c2) Assumes "0" when the multiple-input cell gj exits on the analysis target path Pi, but there is no possibility of occurrence of a multiple-input switching, or when a multiple-input cell gj does not exist on the analysis target path Pi The "positive value according to the possibility" in the above-described (c1) is calculated by the analysis unit 13, based on the difference value d_g(Pmax)–d_g(Pi) of path delay values obtained in determination processing by the determination unit 12. It can be considered that a possibility of occurrence of a multiple-input switching is increased as the above-described difference value d_g(Pmax)–d_g(Pi) reaches closer to "0".

Thus, as the "positive value according to the possibility", for example, "(X–|d_g(Pmax)–d_g(Pi)|)/X" is calculated when X–|d_g(Pmax)–d_g(Pi)|≥0, while "0" is used when X–|d_g(Pmax)–d_g(Pi)|<0, where, X is the threshold value for determination, as described above. Although the "positive value according to the possibility" is calculated using a primary expression in this example, the "positive value according to the possibility" may be calculated using any expression of degree n. For example, when a quadratic expression is used, "[(X–|d_g(Pmax)–d_g(Pi)|)/X]$^2$" is calculated as the "positive value according to the possibility" when X–|d_g(Pmax)–d_g(Pi)|≥0. When a primary expression or quadratic expression as described above is used, the "positive value according to the possibility" becomes "0" when the above-described difference value d_g(Pmax)–d_g(Pi) equals to the threshold value X for determination. On the other hand, it becomes "1" when the above-described difference value d_g(Pmax)–d_g(Pi) is "0" while taking a value in accordance with the magnitude of the difference value when the above-described difference value d_g(Pmax)–d_g(Pi) is 0–1.

Note that the above-described difference value d_g(Pmax)–d_g(Pi) is stored in the storage unit 20 as a determination result by the determination unit 12, and the analysis unit 13 can obtain the above-described difference value d_g(Pmax)–d_g(Pi) from the storage unit 20.

Here, a concrete example of the characteristic of "suspicion of a multiple-input switching" of the first aspect will be described will be described with reference to FIG. 12A to FIG. 14A. In the example of the circuit configuration depicted in FIG. 14A, it is assumed that NAND gates g1 and g2 on the analysis target paths Pi and Pj are determined to have a possibility of occurrence of a multiple-input switching, by the determination unit 12. In this case, as depicted in FIG. 12A and FIG. 13A, in characteristic vectors F(Pi) and F(Pj) of the paths Pi and Pj, the characteristics of "suspicion of a multiple-input switching" of the NAND gates g1 and g2 are set as vector components fg1_Pi and fg2_Pi or fg1_Pj and fg2_Pj.

More specifically, as depicted in FIG. 13A, since the gate g1 which has a possibility of occurrence of a multiple-input switching exists on the path Pi, the characteristic value fg1_Pi for the gate g1 in the characteristic vector F(Pi) is set to "1" (or a positive value in accordance with the possibility), while the characteristic value fg1_Pj for the gate g1 in the characteristic vector F(Pj) is set to "0". Similarly, since the gate g2 which has a possibility of occurrence of a multiple-input switching exists on the path Pj, the characteristic value fg2_Pi for the gate g2 in the characteristic vector F(Pi) is set to "0", while the characteristic value fg2_Pj for the gate g2 in the characteristic vector F(Pj) is set to "1" (or a positive value in accordance with the possibility).

In the example of the characteristic of "suspicion of a multiple-input switching" of the first aspect illustrated therein, one characteristic of "suspicion of a multiple-input switching" is given to one multiple-input cell gj. However, since the increase/decrease of the delay time is varied in accordance with the transition direction (1→0 or 0→1) of the output signal in the multiple-input cell, it is preferred that two of the characteristic of "suspicion of a multiple-input switching" is given to one multiple-input cell and an analysis is made for each of the two transition directions.

In accordance with the characteristic of "suspicion of a multiple-input switching" of the above-described first aspect, characteristics are defined in the number of multiple-input cells which have a possibility of causing a multiple-input switching (when the two transition directions are to be distinguishes, twofold of the number of the cells). When a speed path analysis, which will be described later, is performed using the characteristics as described above, is becomes possible to identify which multiple-input cell has caused a multiple-input switching since the characteristic of "suspicion of a multiple-input switching" is defined for each of the multiple-input cells.

In the second aspect depicted in FIG. 12B, FIG. 13B, and FIG. 14B, the characteristic of "suspicion of a multiple-input switching" is extracted as a value that indicate the possibility of occurrence of a multiple-input switching for each type of multiple-input cell on a analysis target cell, and is extracted as the characteristics, the number of which corresponds to the number of the types of multiple-input cell. In other words, as depicted in FIG. 12B, in the second aspect, the types of multiple-input cell are distinguished from each other, and a characteristic for "suspicion of a multiple-input switching" is provided for each different type of multiple-input cell. In this case, two types of call, namely, "NAND" and "NOR" are given, and characteristics fnand_Pi and fnor_Pi are provided for the respective types.

The characteristic fnand_Pi is provided as following (d1) and (d2):

(d1) Assumes "1" when a NAND gate exists on the path Pi, and there is a possibility of occurrence of a multiple-input switching (or the number of the NAND gates, or a positive value proportional to the number of the gates)

(d2) Assumes "0" when a NAND gate exists on Pi but there is no possibility of occurrence of a multiple-input switching, or when a NAND gate does not exist on Pi Similarly, the characteristic fnor_Pi is provided as following (e1) and (e2):

(e1) Assumes "1" when a NOR gate exists on the path Pi, and there is a possibility of occurrence of a multiple-input switching (or the number of the NOR gates, or a positive value proportional to the number of the gates)

(e2) Assumes "0" when a NOR gate exists on Pi but there is no possibility of occurrence of a multiple-input switching, or when a NOR gate does not exist on Pi Here, a concrete example of the characteristic of "suspicion of a multiple-input switching" of the second aspect will be described will be described with reference to FIG. 12B to FIG. 14B. In the example of the circuit configuration depicted in FIG. 14B, it is assumed that NAND gates g1 and g3 on the analysis target path Pi and a NAND gate g2 on the analysis target path Pj are determined to have a possibility of occurrence of a multiple-input switching, by the determination unit 12. In this case, as depicted in FIG. 12B and FIG. 13B, in characteristic vectors F(Pi) and F(Pj) of the paths Pi and Pj, the characteristics of "suspicion of a multiple-input switching" of the NAND gates and the NOR gates are set as vector components fnand_Pi and fnor_Pi or fnand_Pj and fnor_Pj.

More specifically, as depicted in FIG. 13B, since the two gates g1 and g3 which have a possibility of occurrence of a multiple-input switching exist on the path Pi, the characteristic value fnand_Pi for the NAND gate in the characteristic vector F(Pi) is set to "2". In addition, since the one gate g2 which has a possibility of occurrence of a multiple-input switching exists on the path Pj, the characteristic value fnand_Pj for the NAND gate in the characteristic vector F(Pi) is set to "0". On the other hand, no NOR gate which has a possibility of occurrence of a multiple-input switching exists on the paths Pi and Pj, both the characteristic value fnor_Pi for NOR gate in the characteristic vector F(Pi) and the characteristic value fnor_Pj for NOR gate in the characteristic vector F(Pj) are set to "0".

In the example of the characteristic of "suspicion of a multiple-input switching" of the second aspect illustrated therein, one characteristic of "suspicion of a multiple-input switching" is given to one type of multiple-input cell. However, since the increase/decrease of the delay time is varied in accordance with the transition direction ($1 \rightarrow 0$ or $0 \rightarrow 1$) of the output signal in the multiple-input cell, it is preferred that two of the characteristic of "suspicion of a multiple-input switching" is given to one type of multiple-input cell and an analysis is made for each of the two transition directions.

In accordance with the characteristic of "suspicion of a multiple-input switching" of the above-described second aspect, characteristics are defined in the number of types of multiple-input cell which have a possibility of causing a multiple-input switching (when the two transition directions are to be distinguishes, twofold of the number of the types of cell). Accordingly, the number of the characteristic is reduced as compared to that in the first aspect, which accelerates the analysis processing in the analysis unit 13.

After extracting a characteristic vector F(Pi) as described above for each the analysis target path Pi, the analysis unit 13 performs a speed path analysis taking a multiple-input switching into consideration, based on the following concepts.

Here, when it is assuming that a measurement value of a delay time assigned to each analysis target path Pi obtained in a delay test is "d_silicon(Pi)" and a prediction value of the delay time calculated for each analysis target path Pi, such as using a tool, is "d_predict(Pi)", the difference $\Delta d(Pi)$ between the measurement value and the prediction value is given as the following Formula (3):

$$d\_silicon(Pi)=d\_predict(Pi)+\Delta d(Pi) \tag{3}$$

In the above-described Formula (3), $\Delta d(Pi) \ll d\_predict(Pi)$, in other words, $\Delta d(Pi)$ is sufficiently smaller with respect to d_predict(Pi). Accordingly, the following Formula (4) holds for each analysis target path Pi, since the difference $\Delta d(Pi)$ can be considered to be linearly approximated for a plurality of characteristics f1_Pi, f2_Pi, . . . , fN_Pi (N is a natural number of two or greater), which indicate a phenomenon that has been modeled only in a simplified manner. Formulae (4) are derived in the number of the analysis target paths Pi.

$$\Delta d(Pi)=w1*f1\_Pi+w2*f2\_Pi+ \ldots +wi*fi\_Pi+ \ldots +wN*fN\_Pi \tag{4}$$

where f1_Pi, f2_Pi, . . . , fN_Pi are vector components of a characteristic vector F(Pi) of the path Pi, and the characteristics f1_Pi to fN_Pi contain the characteristic of "suspicion of a multiple-input switching" described above with reference to FIG. 12A to FIG. 14B. Such a characteristic of "suspicion of a multiple-input switching", either fgj_Pi (j=1–x) in the first aspect or fnand_Pi, fnor_Pi in the second aspect is used. In addition, w1, w2, . . . , wN are the vector components f1_Pi to fN_Pi of the characteristic vector F(Pi) of the path Pi. The weight factors w1 to wN contain a weight factor wgj for the characteristics fgj_Pi (j=1–x) in the first aspect, or the weight factors $w_{NAND}$, $W_{NOR}$ for the characteristics fnand_Pi, fnor_Pi in the second aspect.

The analysis unit 13 obtains the values of the weight factors w1, w2, . . . , wN by solving the above-described Formulae (4) derived for each analysis target path Pi for the weight factors w1, w2, . . . , wN, by means of linear regression analysis, such as the SVM (Support Vector Machine) regression. If the value of the weight factor wx obtained in this manner is high, the characteristic fx corresponding to the weight factor wx is considered as a cause of the deviation Δd between the measurement value "d_silicon(Pi)" and the prediction value "d_predict(Pi)".

More specifically, in the case in which a multiple-input switching occurs, since the deviation Δd is caused by the characteristics of "suspicion of a multiple-input switching" fg1_Pi to fgx_Pi or fnand_Pi, fnor_Pi, the value of the weight factor wgj or $w_{NAND}$, $w_{NOR}$ related to the characteristic of "suspicion of a multiple-input switching" is increased. For example, if the first aspect depicted in FIG. 12A to FIG. 14A is adopted, the value(s) of certain weight factors wg1 to wgx is increased, which helps to identify one or more multiple-input cells causing a multiple-input switching. Alternatively, if the second aspect depicted in FIG. 12B to FIG. 14B is adopted, the value(s) of certain weight factors $w_{NAND}$, $w_{NOR}$ is increased, which helps to identify the type of multiple-input cell causing a multiple-input switching.

In contrast, if no multiple-input switching occurs, the value of the weight factor wgj or $w_{NAND}$, $w_{NOR}$ related to the characteristic of "suspicion of a multiple-input switching" is not increased, while another weight factor related to a different characteristic is increase. Thus, it can be decided that the deviation Δd is cased by that characteristic.

As described above, the analysis unit 13 identifies an occurrence situation of a multiple-input switching, based on information on a possibility of occurrence of a multiple-input switching on the multiple-input cell, i.e., the value of the weight factor wgj or $w_{NAND}$, $w_{NOR}$ for the characteristic of "suspicion of a multiple-input switching" fgj_Pi or fnand_Pi, fnor_Pi (Step S100 in FIG. 2).

More specifically, the values as depicted in FIG. 15 are obtained as the weight factors w1, w2, w3, . . . , wg1 (or $w_{NAND}$, wg2 (or $w_{NOR}$) by the analysis unit 13, and the characteristic corresponding to the weights w1 and wg1 (or $w_{NAND}$) equal to or greater than a predetermined value (e.g., 60) is identified as the occurrence cause of the deviation Δd. In other words, if the first aspect depicted in FIG. 12A to FIG. 14A is adopted, the low-power transistor and the multiple-input switching occurring in the gate g1 depicted in FIG. 14A are identified as the occurrence causes of the deviation Δd, based on the analysis result depicted in FIG. 15. In contrast, if the second aspect depicted in FIG. 12B to FIG. 14B is adopted, the low-power transistor and the multiple-input switching occurring in the NAND gates depicted in FIG. 14B are identified as the occurrence causes of the deviation Δd, based on the analysis result depicted in FIG. 15.

(3) Advantageous Effects of Delay Analysis Apparatus of the Present Embodiment in accordance with the present embodiment, a multiple-input cell which has a possibility of occurrence of a multiple-input switching is extracted from a single delay test result using the net list 22 and the SDF file 23. If such a multiple-input cell exists, a measurement value of the delay time obtained in a delay test result is assigned to two or more activation paths related to that multiple-input cell. In other words, if there is a possibility of occurrence of a multiple-input switching, rather than narrowing down to a single activation path for a single delay test result, two or more activation paths and a multiple-input cell that has a possibility of causing a multiple-input switching are treated as targets for a failure analysis. In addition, "suspicion of a multiple-input switching" is introduced as a characteristic of each path, and thus an analysis taking a multiple-input switching into consideration delay cause is performed. Thereby, a prompt determination as of whether there is a possibility of occurrence of a multiple-input switching in a multiple-input cell can be made, and an analysis taking a multiple-input switching into consideration delay cause can be made more precisely and more promptly. In other words, a multiple-input cell or multiple-input cell type causing a multiple-input switching can be identified more precisely and more quickly.

In addition, in accordance with the first aspect of the determination operation, in the determination unit 12, whether or not there is a possibility of occurrence of a multiple-input switching in the gate g can be reliably made by making a determination based on the above-described formula (1).

In accordance with the second aspect of the determination operation, whether or not there is a possibility of occurrence of a multiple-input switching in the gate g is determined in the determination unit 12, based on the above-described formula (2). Thus, the determination is made in the stricter manner than in the above-described first aspect. Accordingly, more multiple-input cells having a possibility of occurrence of a multiple-input switching or activation paths causing a multiple-input switching can be found, and measurement values obtained in a delay test are assigned to the multiple activation paths. Thus, an analysis taking a multiple-input switching in a multiple-input cell in an actual chip into consideration as actual chip as one delay cause can be made, using more pieces of information on the multiple-input switching.

In accordance with the third aspect of the determination operation, as depicted in FIG. 7, if the determination target gate gb is connected to the gate ga which has a possibility of occurrence of a multiple-input switching, and there is a possibility that it is affected by a multiple-input switching of the gate ga, a modification taking such a multiple-input switching into consideration is made to the delay prediction value. Accordingly, whether or not there is a possibility of occurrence of a multiple-input switching in the gate g is reliably determined in the determination unit 12, while taking a multiple-input switching of another multiple-input cell that is determined to have a possibility of occurrence of a multiple-input switching.

In accordance with the fourth aspect of the determination operation, as depicted in FIG. 7, if the determination target gate gb is connected to the gate ga which has a possibility of occurrence of a multiple-input switching, and there is a possibility that it is affected by a multiple-input switching of the gate ga, a modification taking such a multiple-input switching into consideration is made to the delay prediction range. Since a modification is made to expand delay prediction range, as depicted in FIG. 11, whether there is a possibility of occurrence of a multiple-input switching is determined under stricter conditions than in the above-described first to third aspects. Accordingly, more multiple-input cells having a possibility of occurrence of a multiple-input switching or activation paths that may cause a multiple-input switching can be found than in the first to third aspects, and they are treated as targets for a failure analysis. Thus, in the analysis unit 13, an analysis taking a multiple-input switching in a multiple-input cell in an actual chip into consideration as actual chip as one delay cause can be made, using more pieces of information on the multiple-input switching.

If a speed path analysis that has been described above is performed using the characteristic of "suspicion of a multiple-input switching" in the first aspect depicted in FIG. 12A, FIG. 13A, and FIG. 14A, since the characteristics of "suspicion of a multiple-input switching" are defined for the respective multiple-input cells, it is possible to reliably identify the particular multiple-input cell causing a multiple-input switching.

Alternatively, in accordance with the characteristic of "suspicion of a multiple-input switching" in the first aspect depicted in FIG. 12B, FIG. 13B, and FIG. 14B, the number of the vector components (characteristics) is reduced as compared to the characteristic vectors in the first aspect, which accelerates the analysis processing in the analysis unit 13. In addition, it is possible to reliably identify the particular type of multiple-input cell causing a multiple-input switching.

(4) Others

While preferred embodiments of the invention have been described in detailed above, it should be understood that these are exemplary of the invention and are not to be considered as limiting. Any modifications and variations can be made without departing from the spirit of the invention.

Although the above-described embodiment has been described in the context in which multiple-input cells are NAND gates and/or NOR gates, the types of the gates are not limited to these types.

In addition, the functions (a part or all of the functions) as the extraction unit 11, the determination unit 12, the analysis unit 13, the calculation unit 14, and the modification unit 15 that have been described above may be embodied by a computer (including a CPU, an information processing apparatus, various types of terminals) executing a predetermined application program (delay analysis program).

Such a program is provided in the form of a record on computer readable storage medium, for example, a flexible disk, CDs (such as a CD-ROM, CD-R, a CD-RW), DVDs (such as a DVD-ROM, a DVD-RAM, a DVD-R, a DVD-RW, a DVD+R, a DVD+RW), a Blu-ray disk. In this case, the computer reads the program from that storage medium and uses that program after transferring it to the internal storage apparatus or external storage apparatus or the like.

Here, the term "computer" may be a concept including hardware and an OS (operating system), and may refer to hardware that operates under the control of the OS. Alternatively, when an application program alone can make the hardware to be operated without requiring an OS, the hardware itself may represent a computer. The hardware may include, at least a microprocessor, such as a CPU, and device to read a computer program stored on a storage medium. The application program as the above-described delay analysis program includes program codes for making the computer to embody the function of the units 11 to 15. In addition, a part of the functions may be embodied by the OS, rather than the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A delay analysis apparatus that analyzes a delay cause based on a result of a delay test on an actual chip, the apparatus comprising:
an extraction unit that extracts a multiple-input cell receiving two or more activation paths if there are a plurality of activation paths on which a signal propagates on each activation path during the delay test;
a determination unit that determines whether there is a possibility of occurrence of a multiple-input switching, based on an input timing of each signal to the multiple-input cell on the two or more activation paths, for the multiple-input cell extracted by the extraction unit; and
an analysis unit that analyzes an occurrence situation of a multiple-input switching, which is a delay cause, based on a determination result obtained by the determination unit and a result of the delay test.

2. The delay analysis apparatus according to claim 1, wherein the determination unit, when determining that there is a possibility of occurrence of a multiple-input switching in the multiple-input cell, identifies the two or more activation paths inputting to the multiple-input cell as two or more target paths, assigns a measurement value of a delay time obtained in the delay test to the two or more target paths, and notifies the analysis unit of information on the two or more target paths and the measurement value of the delay time, together with information on a possibility of occurrence of a multiple-input switching in the multiple-input cell, as the determination result.

3. The delay analysis apparatus according to claim 2, the apparatus further comprising:
a calculation unit that calculates, as the input timing, a prediction value of a delay time of each signal to the multiple-input cell, based on a net list of the actual chip and a delay information file that stores a prediction value of a delay time of a circuit element including the multiple-input cell of the actual chip in advance, as delay information, prestored therein,
wherein the determination unit compares a maximum prediction value of two or more prediction values calculated by the calculation unit for each of the two or more activation paths with each prediction value other than the maximum prediction value, determines whether a prediction value exists and has a difference from the maximum prediction value within a predetermined value, and if a prediction value exists and has the difference from the maximum prediction value within the predetermined value, determines that there is a possibility of occurrence of a multiple-input switching in the multiple-input cell, and identifies an activation path of the maximum prediction value and an activation path of the prediction value within the predetermined value as the target paths.

4. The delay analysis apparatus according to claim 3, the apparatus further comprising:
a modification unit that determines whether a second multiple-input cell, which is determined that there is a possibility of occurrence of a multiple-input switching, exists on an activation path from a signal input-side to the multiple-input cell, and if the second multiple-input cell exist, modifies the prediction value calculated by the calculation unit for the activation path, based on a property of the second multiple-input cell which is stored in advance.

5. The delay analysis apparatus according to claim 2, the apparatus further comprising:
a calculation unit that calculates, as the input timing, a prediction range of a delay time of each signal to the multiple-input cell, based on a net list of the actual chip and a delay information file that stores a prediction value of a delay time of a circuit element including the multiple-input cell of the actual chip in advance, as delay information,
wherein the determination unit compares a lower limit of a maximum prediction range of two or more prediction ranges calculated by the calculation unit for each of the two or more activation paths with an upper limit of each prediction range other than the maximum prediction range, determines whether a prediction range exists and has an upper limit having a difference from the lower limit of the maximum prediction range within a predetermined value, and if a prediction range exists and has an upper limit within the predetermined value, determines that there is a possibility of occurrence of a multiple-input switching in the multiple-input cell, and identifies an activation path of the maximum prediction range and an activation path of the prediction range which has the upper limit within the predetermined value as the target paths.

6. The delay analysis apparatus according to claim 5, the apparatus further comprising:
a modification unit that determines whether a second multiple-input cell, which is determined that there is a possibility of occurrence of a multiple-input switching, exists on an activation path from a signal input-side to the multiple-input cell, and if the second multiple-input cell exist, modifies the prediction range calculated by the calculation unit for the activation path, based on a property of the second multiple-input cell which is prestored.

7. The delay analysis apparatus according to claim 2, wherein the analysis unit analyzes an occurrence situation of a multiple-input switching, as one delay cause, based on a plurality of analysis target paths including the two or more target paths, information on a possibility of occurrence of a multiple-input switching in a multiple-input cell on the plurality of analysis target paths, a measurement value of the delay time assigned to each analysis target path, and a prediction value of a delay time obtained in advance for each analysis target path.

8. The delay analysis apparatus according to claim 7, wherein the analysis unit
extracts a plurality of characteristics to be an occurrence cause of a difference Δd between a measurement value of the delay time and a prediction value of the delay time for each analysis target path, the plurality of characteristics including information on a possibility of occurrence of a multiple-input switching in the multiple-input cell,
derives a formula satisfying the following for the each analysis target path, $\Delta d = w1*f1 + w2*f2 + \ldots + wi*fi + \ldots + wN*fN$ where f1, f2, . . . , fN (N is an integer number greater than two) are the plurality of characteristics and w1, w2, . . . , wN are weight factors for the plurality of characteristics f1, f2, . . . , fN,
obtains values of the weight factors w1, w2, . . . , wN by solving the plurality of formulae derived for the plurality of analysis target paths for the weight factors w1, w2, . . . , wN, and
identifies an occurrence situation of a multiple-input switching based on a value of a weight factor of the plurality of characteristics for the information on a possibility of occurrence of a multiple-input switching in the multiple-input cell.

9. The delay analysis apparatus according to claim 8, wherein the information on a possibility of occurrence of a multiple-input switching in the multiple-input cell is extracted as a value according to a number of a plurality of multiple-input cells, which is a value indicating a possibility of occurrence of a multiple-input switching for each of the plurality of multiple-input cells on each analysis target path.

10. The delay analysis apparatus according to claim 9, wherein the value indicating the possibility of occurrence takes zero if the determination unit determines that there is no possibility, and takes a positive value if it determines that there is a possibility.

11. The delay analysis apparatus according to claim 9, wherein the value indicating the possibility of occurrence takes zero if the determination unit determines that there is no possibility, and takes a positive value according to a magnitude of the possibility if it determines that there is a possibility.

12. The delay analysis apparatus according to claim 8, wherein the information on a possibility of occurrence of a multiple-input switching in the multiple-input cell is extracted as a value according to a number of types of multiple-input cell on each analysis target path, which is a value indicating a possibility of occurrence of a multiple-input switching for each type of multiple-input cell on each analysis target path.

13. The delay analysis apparatus according to claim 12, wherein the value indicating the possibility of occurrence takes zero if the determination unit determines that there is no possibility, and takes a positive value if it determines that there is a possibility.

14. The delay analysis apparatus according to claim 12, wherein the value indicating the possibility of occurrence takes zero, if the determination unit determines that there is no possibility for all multiple-input cells of an identical type, and takes a positive value proportional to the number of multiple-input cells of an identical type which are determined to have a possibility for multiple-input cells of the identical type.

15. A delay analysis apparatus that analyzes a delay cause based on a result of a delay test on an actual chip, the apparatus comprising:
a processor configured to execute a procedure, the procedure comprising:
extracting a multiple-input cell receiving two or more activation paths if there are a plurality of activation paths on which a signal propagates on each activation path during the delay test;
determining whether there is a possibility of occurrence of a multiple-input switching, based on an input timing of each signal to the multiple-input cell on the two or more activation paths, for the extracted multiple-input cell; and
analyzing an occurrence situation of a multiple-input switching, which is a delay cause, based on a determination result obtained by the determining and a result of the delay test.

16. A non-transitory computer-readable medium storing a delay analysis program that makes a computer execute a procedure for analyzing a delay cause based on a result of a delay test on an actual path, the procedure comprising:
extracting a multiple-input cell receiving two or more activation paths if there are a plurality of activation paths on which a signal propagates on each activation path during the delay test;
determining whether there is a possibility of occurrence of a multiple-input switching, based on an input timing of each signal to the multiple-input cell on the two or more activation paths, for the extracted multiple-input cell; and
analyzing an occurrence situation of a multiple-input switching which is a delay cause, based on a determination result of the determining and a result of the delay test.

17. The non-transitory computer-readable medium according to claim 16, the procedure further comprising:

when it is determined that there is a possibility of occurrence of a multiple-input switching in the multiple-input cell, identifying the two or more activation paths inputting to the multiple-input cell as two or more target paths, assigning a measurement value of a delay time obtained in the delay test to the two or more target paths, and notifying of information on the two or more target paths and the measurement value of the delay time, together with information on a possibility of occurrence of a multiple-input switching in the multiple-input cell, as the determination result.

18. The non-transitory computer-readable medium according to claim 17, the procedure further comprising:

calculating, as the input timing, a prediction range of a delay time of each signal to the multiple-input cell, based on a net list of the actual chip and a delay information file that stores a prediction value of a delay time of a circuit element including the multiple-input cell of the actual chip in advance, as delay information, comparing a lower limit of a maximum prediction range of two or more prediction ranges calculated for each of the two or more activation paths with an upper limit of each prediction range other than the maximum prediction range, determining whether a prediction range exists and has an upper limit having a difference from the lower limit of the maximum prediction range within a predetermined value, and if a prediction range exists and has an upper limit within the predetermined value, determining that there is a possibility of occurrence of a multiple-input switching in the multiple-input cell, and identifying an activation path of the maximum prediction range and an activation path of the prediction range which has the upper limit within the predetermined value as the target paths.

19. The non-transitory computer-readable medium according to claim 18, the procedure further comprising:

determining whether a second multiple-input cell, which is determined that there is a possibility of occurrence of a multiple-input switching, exists on an activation path from a signal input-side to the multiple-input cell, and if the second multiple-input cell exist, modifying the prediction range calculated for the activation path, based on a property of the second multiple-input cell which is prestored.

20. A delay analysis method that analyzes a delay cause based on a result of a delay test on an actual chip by means of a computer, the delay analysis method comprising:

extracting a multiple-input cell receiving two or more activation paths if there are a plurality of activation paths on which a signal propagates on each activation path during the delay test;

determining whether there is a possibility of occurrence of a multiple-input switching for the extracted multiple-input cell, based on an input timing of each signal to the multiple-input cell on the two or more activation paths; and analyzing an occurrence situation of a multiple-input switching, which is a delay cause, based on a determination result obtained by the determining and a result of the delay test.

* * * * *